(12) United States Patent
Costantino et al.

(10) Patent No.: US 9,985,289 B2
(45) Date of Patent: *May 29, 2018

(54) ENHANCED PACKING OF ENERGY STORAGE PARTICLES

(71) Applicant: BASF SE, Ludwigshafen (DE)

(72) Inventors: Henry R. Costantino, Woodinville, WA (US); Chad Goodwin, Seattle, WA (US); William D. Scott, Seattle, WA (US); Aaron M. Feaver, Seattle, WA (US)

(73) Assignee: BASF SE, Ludwigshafen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/199,343

(22) Filed: Jun. 30, 2016

(65) Prior Publication Data

US 2017/0155148 A1    Jun. 1, 2017

Related U.S. Application Data

(63) Continuation of application No. 14/150,547, filed on Jan. 8, 2014, now Pat. No. 9,412,523, which is a
(Continued)

(51) Int. Cl.
*H01M 4/587* (2010.01)
*H01M 10/0525* (2010.01)
(Continued)

(52) U.S. Cl.
CPC ............ *H01M 4/587* (2013.01); *H01G 11/34* (2013.01); *H01G 11/42* (2013.01); *H01M 10/0525* (2013.01); *H01M 2004/021* (2013.01)

(58) Field of Classification Search
CPC ............ H01B 1/04; H01G 2009/0025; H01G 2009/0007; H01G 11/32; H01G 11/34;
(Continued)

(56) References Cited

U.S. PATENT DOCUMENTS 3,518,123 A    6/1970 Katsoulis et al.
3,619,428 A    11/1971 David
(Continued)

FOREIGN PATENT DOCUMENTS

CA    2176452 A1    11/1997
CN    1554102 A    12/2004
(Continued)

OTHER PUBLICATIONS

Gao et al., "Nitrogen-rich graphene from small molecules as high performance anode material," *Nanotechnology* 25:415402, 2014. (8 pages).
(Continued)

*Primary Examiner* — Brittany Raymond
(74) *Attorney, Agent, or Firm* — Seed IP Law Group LLP

(57) ABSTRACT

The present application is generally directed to energy storage materials such as activated carbon comprising enhanced particle packing properties and devices containing the same. The energy storage materials find utility in any number of devices, for example, in electric double layer capacitance devices and batteries. Methods for making the energy storage materials are also disclosed.

33 Claims, 12 Drawing Sheets

Related U.S. Application Data continuation of application No. 13/250,430, filed on Sep. 30, 2011, now Pat. No. 8,654,507.

(60) Provisional application No. 61/388,388, filed on Sep. 30, 2010.

(51) Int. Cl.
*H01G 11/34* (2013.01)
*H01G 11/42* (2013.01)
*H01M 4/02* (2006.01)

(58) Field of Classification Search
CPC ........ H01G 11/38; H01G 11/62; H01G 11/60; H01G 11/24; H01G 9/035; H01G 9/042; H01M 4/364; H01M 4/386; H01M 4/583; H01M 10/0569; Y10T 428/2982; Y02T 10/7022; Y02E 60/13
See application file for complete search history.

(56) References Cited

U.S. PATENT DOCUMENTS

| | | |
|---|---|---|
| 3,876,505 A | 4/1975 | Stoneburner |
| 3,977,901 A | 8/1976 | Buzzelli |
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pcz et al. |
| 4,769,197 A | 9/1988 | Kromrey |
| 4,843,015 A | 6/1989 | Grubbs, Jr. et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 4,999,330 A | 3/1991 | Bose et al. |
| 5,061,416 A | 10/1991 | Willkens et al. |
| 5,093,216 A | 3/1992 | Azuma et al. |
| 5,260,855 A | 11/1993 | Kaschmitter et al. |
| 5,294,498 A | 3/1994 | Omaru et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,614,460 A | 3/1997 | Schwarz et al. |
| 5,626,637 A | 5/1997 | Baker |
| 5,626,977 A | 5/1997 | Mayer et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Bülow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,293,818 B2 | 10/2012 | Costantino et al. |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,691,177 B2 | 4/2014 | Pfeifer et al. |
| 8,709,971 B2 | 4/2014 | Feaver et al. |
| 8,797,717 B2 | 8/2014 | Feaver et al. |
| 8,906,978 B2 | 12/2014 | Costantino et al. |
| 8,916,296 B2 | 12/2014 | Feaver et al. |
| 9,067,848 B2 | 6/2015 | Stadie et al. |
| 9,112,230 B2 | 8/2015 | Feaver et al. |
| 9,136,064 B2 | 9/2015 | Gadkaree et al. |
| 9,269,502 B2 | 2/2016 | Chang et al. |
| 9,287,556 B2 | 3/2016 | Neumann et al. |
| 9,409,777 B2 | 8/2016 | Geramita et al. |
| 9,580,321 B2 | 2/2017 | Feaver et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0104474 A1 | 8/2002 | Wakamatsu et al. |
| 2002/0114126 A1 | 8/2002 | Hirahara et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0108785 A1 | 6/2003 | Wu et al. |
| 2003/0170548 A1 | 9/2003 | Otsuki et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa et al. |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0266990 A1 | 12/2005 | Iwasaki et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando et al. |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0142222 A1 | 6/2007 | Erkey et al. |

(56) References Cited

U.S. PATENT DOCUMENTS

| | | |
|---|---|---|
| 2007/0166602 A1 | 7/2007 | Burchardt |
| 2008/0044726 A1 | 2/2008 | Feng et al. |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0180881 A1 | 7/2008 | Feaver et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0110613 A1 | 5/2010 | Zhong et al. |
| 2010/0288970 A1 | 11/2010 | Watanabe et al. |
| 2010/0310941 A1 | 12/2010 | Kumta et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0200848 A1 | 8/2011 | Chiang et al. |
| 2011/0281180 A1 | 11/2011 | Kim et al. |
| 2011/0287189 A1 | 11/2011 | Shembel et al. |
| 2012/0045685 A1 | 2/2012 | Iguchi et al. |
| 2012/0129049 A1 | 5/2012 | Rayner |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0321959 A1 | 12/2012 | Yushin et al. |
| 2013/0004841 A1 | 1/2013 | Thompkins et al. |
| 2013/0169238 A1 | 7/2013 | Rojeski |
| 2013/0189575 A1 | 7/2013 | Anguchamy et al. |
| 2013/0244862 A1 | 9/2013 | Ivanovici et al. |
| 2013/0252082 A1 | 9/2013 | Thompkins et al. |
| 2013/0295462 A1 | 11/2013 | Atanassova et al. |
| 2013/0344391 A1 | 12/2013 | Yushin et al. |
| 2014/0045685 A1 | 2/2014 | Iguchi et al. |
| 2014/0170482 A1 | 6/2014 | Park et al. |
| 2014/0272592 A1 | 9/2014 | Thompkins et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0062781 A1 | 3/2015 | Feaver et al. |
| 2015/0162603 A1 | 6/2015 | Yushin et al. |
| 2015/0255800 A1 | 9/2015 | Feaver et al. |
| 2015/0283534 A1 | 10/2015 | Constantino et al. |
| 2016/0122185 A1 | 5/2016 | Feaver et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0015559 A1 | 1/2017 | Costantino et al. |
| 2017/0152340 A1 | 6/2017 | Geramita et al. |
| 2017/0155148 A1 | 6/2017 | Costantino et al. |
| 2017/0170477 A1 | 6/2017 | Sakshaug et al. |
| 2017/0346084 A1 | 11/2017 | Sakshaug et al. |
| 2017/0349442 A1 | 12/2017 | Feaver et al. |

FOREIGN PATENT DOCUMENTS

| | | |
|---|---|---|
| CN | 1762900 A | 4/2006 |
| CN | 1986401 A | 6/2007 |
| CN | 101194384 A | 6/2008 |
| CN | 101318648 A | 12/2008 |
| CN | 101604743 A | 12/2009 |
| CN | 101969120 A | 2/2011 |
| CN | 102482095 A | 5/2012 |
| CN | 102820455 A | 12/2012 |
| CN | 102834955 A | 12/2012 |
| CN | 103094528 A | 5/2013 |
| CN | 104108698 A | 10/2014 |
| EP | 0 649 815 A1 | 4/1995 |
| EP | 0 861 804 A1 | 9/1998 |
| EP | 1 049 116 A1 | 11/2000 |
| EP | 1 052 716 A2 | 11/2000 |
| EP | 1 115 130 A1 | 7/2001 |
| EP | 1 248 307 A1 | 10/2002 |
| EP | 1 514 859 A2 | 3/2005 |
| EP | 2 117 068 A1 | 11/2009 |
| EP | 2 983 186 A1 | 2/2016 |
| JP | 2-300222 A | 12/1990 |
| JP | 4-59806 A | 2/1992 |
| JP | 4-139174 A | 5/1992 |
| JP | 5-117493 A | 5/1993 |
| JP | 5-156121 A | 6/1993 |
| JP | 5-320955 A | 12/1993 |
| JP | 7-232908 A | 9/1995 |
| JP | 8-59919 A | 3/1996 |
| JP | 8-112539 A | 5/1996 |
| JP | 9-63905 A | 3/1997 |
| JP | 9-275042 A | 10/1997 |
| JP | 9-328308 A | 12/1997 |
| JP | 10-297912 A | 11/1998 |
| JP | 2001-89119 A | 4/2001 |
| JP | 2001-278609 A | 10/2001 |
| JP | 2002-532869 A | 10/2002 |
| JP | 2004-67498 A | 3/2004 |
| JP | 2004-514637 A | 5/2004 |
| JP | 2004-203715 A | 7/2004 |
| JP | 2004-221332 A | 8/2004 |
| JP | 2004-315283 A | 11/2004 |
| JP | 2005-93984 A | 4/2005 |
| JP | 2005-136397 A | 5/2005 |
| JP | 2005-187320 A | 7/2005 |
| JP | 2006-160597 A | 6/2006 |
| JP | 2006-248848 A | 9/2006 |
| JP | 2006-264993 A | 10/2006 |
| JP | 2007-115749 A | 5/2007 |
| JP | 2008-7387 A | 1/2008 |
| JP | 2008-94925 A | 4/2008 |
| JP | 2009-259803 A | 11/2009 |
| WO | 95/01165 A1 | 1/1995 |
| WO | 98/30496 A1 | 7/1998 |
| WO | 02/39468 A2 | 5/2002 |
| WO | 2004/087285 A1 | 10/2004 |
| WO | 2004/099073 A2 | 11/2004 |
| WO | 2004/110930 A1 | 12/2004 |
| WO | 2005/043653 A1 | 5/2005 |
| WO | 2007/061761 A1 | 5/2007 |
| WO | 2008/047700 A1 | 4/2008 |
| WO | 2008/113133 A1 | 9/2008 |
| WO | 2009/032104 A2 | 3/2009 |
| WO | 2010/032782 A1 | 3/2010 |
| WO | 2010/059749 A1 | 5/2010 |
| WO | 2010/138760 A2 | 12/2010 |
| WO | 2011/002536 A2 | 1/2011 |
| WO | 2011/003033 A1 | 1/2011 |
| WO | 2012/045002 A1 | 4/2012 |
| WO | 2012/071916 A1 | 6/2012 |
| WO | 2012/092210 A1 | 7/2012 |
| WO | 2013/120009 A1 | 8/2013 |

(56) References Cited

FOREIGN PATENT DOCUMENTS

WO 2013/120011 A1 8/2013
WO 2014/201275 A2 12/2014

OTHER PUBLICATIONS

Hong et al., "Hydrogen evolution inhibition with diethylenetriamine modification of activated carob for a lead-acid battery," *RSC Adv* 4:33574-33577, 2014.
Abraham et al., "A Polymer Electrolyte-Based Rechargeable Lithium/Oxygen Battery," *J. Electrochem. Soc.* 143(1):1-5, Jan. 1996.
Alcañiz-Monge et al., "Methane Storage in Activated Carbon Fibres," *Carbon* 35(2):291-297, 1997.
Anderegg, "Grading Aggregates: II—The Application of Mathematical Formulas to Mortars," *Industrial and Engineering Chemistry* 23(9): 1058-1064, 1931.
Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930, with translation of summary. (17 pages).
Babić et al., "Carbon cryogel as support of platinum nano-sized electrocatalyst for the hydrogen oxidation reaction," *Electrochimica Acta* 51:3820-3826, 2006.
Babić et al., "Characterization of carbon cryogel synthesized by sol-gel polycondensation and freeze-drying," *Carbon* 42:2617-2624, 2004.
Babić et al., "Characterization of carbon cryogels synthesized by sol-gel polycondensation," *J. Serb. Chem. Soc.* 70(1):21-31, 2005.
Barbieri et al., "Capacitance limits of high surface area activated carbons for double layer capacitors," *Carbon* 43:1303-1310, 2005.
Barton et al., "Tailored Porous Materials," *Chem. Mater.* 11:2633-2656, 1999.
Beattie et al., "High-Capacity Lithium-Air Cathodes," *J. Electrochem. Soc.* 156(1):A44-A47, 2009.
Besenhard, "Handbook of battery materials," *Weinheim, Wiley—VCH, Weinheim*, New York, 398-401, Dec. 31, 1999.
Bock et al., "Structural Investigation of Resorcinol Formaldehyde and Carbon Aerogels Using SAXS and BET," *Journal of Porous Materials* 4:287-294, 1997.
Buiel, et al., "Li-insertion in hard carbon anode materials for Li-ion batteries," *Electrochimica Acta* 45:121-130, 1999.
Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.
Butler et al., "Braking Performance Test Procedure for the Hybrid Vehicle Energy Storage Systems: Capacitor Test Results," *Joint International Meeting of the Electrochemical Society, Abstract 684*, Honolulu, HI, Oct. 3-8, 2004, 5 pages.
Cao et al., "Li-ion capacitors with carbon cathode and hard carbon/stabilized lithium metal powder anode electrodes," *Journal of Power Sources* 213:180-185, Apr. 2012.
Chmiola et al., "Anomalous Increase in Carbon Capacitance at Pore Sizes Less Than 1 Nanometer," *Science* 313:1760-1763, Sep. 22, 2006.
Conway et al., "Partial Molal Volumes of Tetraalkylammonium Halides and Assignment of Individual Ionic Contributions," *Trans. Faraday Soc.* 62:2738-2749, 1966.
Czakkel et al., "Influence of drying on the morphology of resorcinol-formaldehyde-based carbon gels," *Microporous and Mesoporous Materials* 86:124-133, 2005.
Débart et al., "α-$MnO_2$ Nanowires: A Catalyst for the $O_2$ Electrode in Rechargeable Lithium Batteries," *Agnew. Chem. Int. Ed.* 47:4521-4524, 2008.
Ding et al., "How Conductivities and Viscosities of PC-DEC and PC-EC Solutions of $LiBF_4$, $LiPF_6$, LiBOB, $Et_4NBF_4$, and $Et_4NBF_6$ Differ and Why," *Journal of the Electrochemical Society* 151(12):A2007-A2015, 2004.

Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Furnas, "Grading Aggregates I—Mathematical Relations for Beds of Broken Solids of Maximum Density," *Industrial and Engineering Chemistry* 23(9):1052-1058, 1931.
Gouérec et al., "Preparation and Modification of Polyacrylonitrile Microcellular Foam Films for Use as Electrodes in Supercapacitors," *Journal of the Electrochemical Society* 148(1):A94-A101, 2001.
Hahn et al., "A dilatometric study of the voltage limitation of carbonaceous electrodes in aprotic EDLC type electrolytes by charge-induced strain," *Carbon* 44:2523-2533, 2006.
Hasegawa et al., "Preparation of carbon gel microspheres containing silicon powder for lithium ion battery anodes," *Carbon* 42:2573-2579, 2004.
Hirscher et al., "Are carbon nanostructures an efficient hydrogen storage medium?" *Journal of Alloys and Compounds* 356-357:433-437, 2003.
Hsieh et al., "Synthesis of mesoporous carbon composite and its electric double-layer formation behavior," *Microporous and Mesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299-308, 2004.
Inomata et al., "Natural gas storage in activated carbon pellets without a binder," *Carbon* 40:87-93, 2002.
Job et al., "Carbon aerogels, cryogels and xerogels: Influence of the drying method on the textural properties of porous carbon materials," *Carbon* 43:2481-2494, 2005.
Job et al., "Highly dispersed platinum catalysts prepared by impregnation of texture-tailored carbon xerogels," *Journal of Catalysis* 240:160-171, 2006.
Job et al., "Synthesis of transition metal-doped carbon xerogels by solubilization of metal salts in resorcinol-formaldehyde aqueous solution," *Carbon* 42:3217-3227, 2004.
Khomenko et al., "High-voltage asymmetric supercapacitors operating in aqueous electrolyte," *Appl. Phys. A* 82:567-573, 2006.
Kim et al., "Correlation between the capacitor performance and pore structure," *Tanso* 221:31-39, 2006.
Kim et al., "Adsorption of phenol and reactive dyes from aqueous solution on carbon cryogel microspheres with controlled porous structure," *Microporous and Mesoporous Materials* 96:191-196, 2006.
Kocklenberg et al., "Texture control of freeze-dried resorcinol-formaldehyde gels," *Journal of Non-Crystalline Solids* 225:8-13, 1998.
Konno et al., "Preparation of activated carbon having the structure derived from biomass by alkali activation with NaOH, and its application for electric double-layer capacitor," *Tanso* 231:2-7, 2008.
Kowalczyk et al., "Estimation of the pore-size distribution function from the nitrogen adsorption isotherm. Comparison of density functional theory and the method of Do and co-workers," *Carbon* 41:1113-1125, 2003.
Lozano-Castelló et al., "Influence of pore structure and surface chemistry on electric double layer capacitance in non-aqueous electrolyte," *Carbon* 41:1765-1775, 2003.
Lozano-Castelló et al., "Powdered Activated Carbons and Activated Carbon Fibers for Methane Storage: A Comparative Study," *Energy & Fuels* 16:1321-1328, 2002.

(56) References Cited

OTHER PUBLICATIONS

McEwen et al., "Nonequeous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status of Present Commercial Devices," Proceedings of the 8th International Seminar on Double Layer Capacitors and Similar Energy Storage Devices, Deerfield Beach, Florida, Dec. 7-9, 1998, 9 pages.
Naoi et al., "Second generation 'nanohybrid supercapacitor': Evolution of capacitive energy storage devices," *Energy Environ. Sci.* 5:9363-9373, 2012.
Nishihara et al., "Preparation of resorcinol—formaldehyde carbon cryogel microhoneycombs," *Carbon* 42:899-901, 2004.
Ogasawara et al., "Rechargeable $LI_2O_2$ Electrode for Lithium Batteries," *Journal American Chemical Society* 128(4):1390-1393, 2006.
Otowa et al., "Production and adsorption characteristics of MAXSORB: High-surface-area active carbon," *Gas seperation and Purification* 7(4):241-245, 1993.
Pääkkö, "Long and entangled native cellulose I nanofibers allow flexible aerogels and hierarchically porous templates for functionalities," *Soft Matter* 4:2492-2499, 2008.
Pekala et al., "Aerogels derived from multifunctional organic monomers," *Journal of Non-Crystalline Solids* 145:90-98, 1992.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from $N_2$, Ar, and $CO_2$ Adsorption Isotherms," *Langmuir* 16:2311-2320, 2000.
Read et al., "Oxygen Transport Properties of Organic Electrolytes and Performance of Lithium/Oxygen Battery," *J. Electrochem. Soc.* 150(10):A1351-A1356, 2003.
Read, "Characterization of the Lithium/Oxygen Organic Electrolyte Battery," *J. Electrochemical Soc.* 149(9):A1190-A1195, 2002.
Read, "Ether-Based Electrolytes for the Lithium/Oxygen Organic Electrolyte Battery," *J. Electrochem. Soc.* 153(1):A96-A100, 2006.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of the Electrochemical Society* 147(7):2486-2493, 2000.
Setoyama et al., "Simulation Study on the Relationship Between A High Resolution $\alpha_S$-Plot and the Pore Size Distribution for Activated Carbon," *Carbon* 36(10):1459-1467, 1998.
Simon et al., "Materials for electrochemical capacitors," *Nature Materials* 7:845-854, Nov. 2008.
Sivakkumar et al., "Evaluation of Lithium-ion capacitors assembled with pre-lithiated graphite anode and activated carbon cathode," *Electrochimica Acta* 65:280-287, Jan. 2012.
Takeuchi et al., "Removal of single component chlorinated hydrocarbon vapor, by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso Carbon Products, "Special Graphite and Compound Material Products," *Toyo Tanso Co., Ltd.* Catalog published 2008.
Toyo Tanso, "Graphite Applications," *Toyo Tanso Co., Ltd.* Catalog published 1998. (Machine Translation Attached).
Toyo Tanso, "Isotropic Graphite Engineering Data," *Toyo Tanso Co., Ltd.* Catalog published 1994.
Toyo Tanso, "Isotropic Graphite Technical Data," *Toyo Tanso Co., Ltd.* Catalog published 1997.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
WebElements, "Lead: the essentials," attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Wu et al., "Fabrication and nano-structure control of carbon aerogels via a microemulsion-templated sol-gel polymerization method," *Carbon* 44:675-681, 2006.
Xie et al., "Pore size control of Pitch-based activated carbon fibers by pyrolytic deposition of propylene," *Applied Surface Science* 250:152-160, 2005.
Xu et al., "Synthesis of mesoporous carbon and its adsorption property to biomolecules," *Microporous and Mesoporous Materials* 115:461-468, 2008.
Xu et al., "Optimization of Nonaqueous Electrolytes for Primary Lithium/Air Batteries Operated in Ambient Environment," *Journal of the Electrochemical Society* 156(10):A773-A779, 2009.
Yamamoto et al., "Control of mesoporosity of carbon gels prepared by sol-gel polycondensation and freeze drving," *Journal of Non-Crystalline Solids* 288:46-55, 2001.
Yamamoto et al., "Porous properties of carbon gel microspheres as adsorbents for gas separation," *Carbon* 42:1671-1676, 2004.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte $Li/O_2$ battery," *Journal of Power Sources* 195:1235-1240, 2010.

ENHANCED PACKING OF ENERGY STORAGE PARTICLES

BACKGROUND

Technical Field

The present invention generally relates to the packing of energy storage particles, for example activated carbon particles, as well as to compositions and devices containing such particles and methods related to the same.

Description of the Related Art

Energy storage materials are commonly employed in electrical storage and distribution devices. For example, devices containing particles of activated carbon, silicon, sulfur, lithium, and combinations thereof, as energy storage media are ubiquitous throughout the electrical industry. Of these, activated carbon particles find particular use in a number of devices because the high surface area, conductivity and porosity of activated carbon allows for the design of electrical devices having higher energy density than devices employing other materials.

Electric double-layer capacitors (EDLCs) are an example of devices that contain activated carbon particles. EDLCs often have electrodes prepared from an activated carbon material and a suitable electrolyte, and have an extremely high energy density compared to more common capacitors. Typical uses for EDLCs include energy storage and distribution in devices requiring short bursts of power for data transmissions, or peak-power functions such as wireless modems, mobile phones, digital cameras and other handheld electronic devices. EDLCs are also commonly used in electric vehicles such as electric cars, trains, buses and the like.

Batteries are another common energy storage and distribution device which often contain activated carbon particles (e.g., as anode material, current collector, or conductivity enhancer). Examples of carbon-containing batteries include lithium air batteries, which use porous carbon as the current collector for the air electrode, and lead acid batteries which often include carbon additives in either the anode or cathode. Batteries are employed in any number of electronic devices requiring low current density electrical power (as compared to an EDLC's high current density).

An important characteristic to be considered in the design of electrical storage and distribution devices comprising activated carbon particles is volumetric performance. For example, in many of the devices described above, size is a constraint, and the physical size of the electrode is limited. Thus, high volumetric capacitance (i.e., capacitance per unit volume) is a desired characteristic of an electrode and the EDLC comprising the electrode(s). Volumetric capacitance of an EDLC is believed to be, at least in part, related to the efficiency of the activated carbon particle packing within the electrode. As the carbon particle packing approaches an optimum value (i.e., theoretical maximum number of carbon particles per unit volume), the inter-particle volume is minimized, and the volumetric capacitance of the EDLC electrode is expected to increase. This same principle is believed to apply to other types of energy storage particles and electrical devices containing the same.

Current methods for preparing activated carbon particles do not result in activated carbon particles having a particle size distribution which provides for optimized particle packing. One common method for producing high surface area activated carbon material is to pyrolyze an existing carbon-containing material (e.g., coconut fibers or tire rubber). Activated carbon materials can also be prepared by chemical activation. For example, treatment of a carbon-containing material with an acid, base or salt (e.g., phosphoric acid, potassium hydroxide, sodium hydroxide, zinc chloride, etc.) followed by heating results in an activated carbon material. Another approach for producing high surface area activated carbon materials is to prepare a synthetic polymer from carbon-containing organic building blocks. As with the existing organic materials, the synthetically prepared polymers are pyrolyzed and activated to produce an activated carbon material. In contrast to the traditional approach described above, the intrinsic porosity of the synthetically prepared polymer results in higher process yields because less material is lost during the activation step.

The activated carbon particles prepared according to the above methods may be further processed to reduce the particle size. Such methods include milling, such as ball milling, cryo-milling and bead milling, as well as crushing. While these methods may improve the particle packing over the unprocessed carbon material, current applications of such methods are not sufficient to provide an activated carbon material having a particle size distribution which provides for optimized particle packing.

While significant advances have been made in the field, there continues to be a need in the art for energy storage materials, for example activated carbon particles, comprising a particle size distribution which provides for optimized particle packing, as well as for methods of making the same and devices containing the same. The present invention fulfills these needs and provides further related advantages.

BRIEF SUMMARY

In general terms, the present invention is directed to energy storage materials comprising a plurality of energy storage particles. In one particular embodiment, the energy storage material is activated carbon and the energy storage particles are activated carbon particles. In this embodiment, the plurality of carbon particles comprises a particle size distribution such that particle packing is optimized relative to other known carbon materials. Such optimized particle packing allows for preparation of carbon electrodes comprising packing densities and volumetric performance not previously obtainable. Accordingly, the disclosed carbon materials find application in the context of electrical storage and distribution devices, particularly for use in electrodes for EDLCs and batteries having improved volumetric performance.

Accordingly, in one embodiment, an energy storage material is provided, the energy storage material comprising a plurality of energy storage particles, wherein the plurality of energy storage particles comprises a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3.

In other embodiments, the present disclosure provides an energy storage material comprising a plurality of energy storage particles, wherein the plurality of energy storage particles comprises a packing ratio of 0.97 or greater when formed into an electrode.

In still other embodiment, the present disclosure is directed a carbon material having a calendaring ratio of at least 40% when combined with a binder and formed into an electrode.

In yet other embodiments, the disclosure provides a carbon material comprising a plurality of carbon particles, wherein the carbon particles comprise a trimodal particle size distribution having first, second and third particle size maxima, wherein the first particle size maxiumum is at about 0.1 µm to about 0.2 µm, the second particle size maximum is at about 0.9 µm to about 1.0 µm and the third particle size maximum is at about 9 µm to about 10 µm.

In another embodiment, a device comprising a carbon material is provided. The carbon material comprises a plurality of carbon particles, the plurality of carbon particles comprising a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3.

In other embodiments, the present disclosure is directed to an electrode comprising a carbon material, wherein the carbon material comprises a plurality of carbon particles, the plurality of carbon particles comprising a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3. In other embodiments, the present disclosure provides an electrode consisting essentially of a binder and an amorphous carbon material having a surface area of at least 1,500 $M^2$/g.

In still other embodiments, the disclosure is directed to an electrode having a thickness D µm and comprising a carbon material comprising a plurality of carbon particles, wherein the carbon particles have a packing ratio of at least 0.97 when combined with a binder and formed into an electrode, and the plurality of carbon particles comprises a trimodal particle size distribution comprised of a first collection of particles having a mean particle size A µm, a second collection of particles having a mean particle size B µm and a third collection of particles having a mean particle size C µm, wherein A:B and B:C are each between about 100:1 and 2:1 and D:A is between about 2:1 and 100:1.

In still other embodiments, the present disclosure provides a method for preparing a carbon material comprising a plurality of carbon particles, the plurality of carbon particles comprising a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3, the method comprising:

a) providing two or more carbon samples, each carbon sample comprising a unique particle size distribution; and b) blending the two or more carbon samples at a predetermined ratio to obtain the carbon material.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1A:
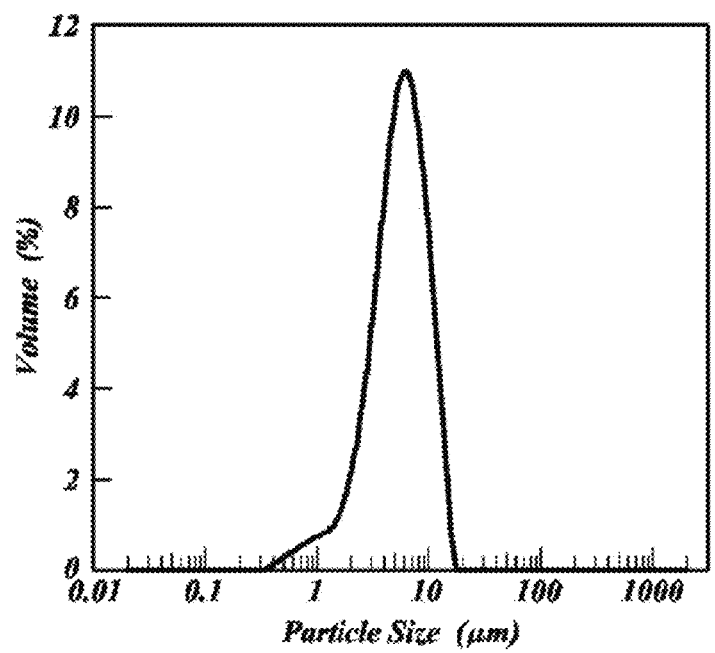
FIG. 1A shows particle size distributions (PSD) for a representative (prior art) milled, activated carbon material.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

DEFINITIONS

As used herein, and unless the context dictates otherwise, the following terms have the meanings as specified below.

"Energy storage material" refers to a material capable of storing electrical charge, for example in the form of physically entrained electrolytes. Energy storage materials are capable of being charged and discharged. Examples of energy storage materials include, but are not limited to, carbon, for example activated carbon, silicon, sulfur, lithium, and combinations thereof. Energy storage materials may be used in the form of particles, or combinations of inter- and/or intra-particle blends of particles. Energy storage particles can be assembled into electrodes employing dry processing or aqueous or non-aqueous slurry processing as described in the art.

"Carbon material" refers to a material or substance comprised substantially of carbon. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

"Conductivity enhancer" is a carbon material which is commonly added to carbon electrodes to increase electrochemical performance of the electrode. Conductivity enhancers are generally submicron sized particles of carbon with low pore volume. Examples of conductivity enhancers include graphite and carbon black.

"Packing Ratio" is defined as the inverse of the electrode density divided by the sum of the inverse of the skeletal density of the carbon (typically 2.2 g/cc) and the pore volume as measured using nitrogen sorption. A packing ratio of 1.0 would indicate that optimized packing has been achieved. A packing ratio of less than one indicates that less than optimum packing has been achieved, and a packing ratio of greater than one indicates that packing is optimized beyond that expected based on the mass and volume of the combined electrode components.

"Impurity" or "impurity element" refers to a foreign substance (e.g., a chemical element) within a material which differs from the chemical composition of the base material. For example, an impurity in a carbon material refers to any element or combination of elements, other than carbon, which is present in the carbon material. Impurity levels are typically expressed in parts per million (ppm).

"PIXE impurity" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ash content" refers to the nonvolatile inorganic matter which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a macromolecule comprised of two or more structural repeating units.

"Synthetic polymer precursor material" or "polymer precursor" refers to the compounds used in the preparation of a synthetic polymer. Examples of polymer precursors that can be used in the preparations disclosed herein include, but are not limited to aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"RF polymer hydrogel" refers to a sub-class of polymer gel wherein the polymer was formed from the catalyzed reaction of resorcinol and formaldehyde in water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Mixed solvent system" refers to a solvent system comprised of two or more solvents, for example, two or more miscible solvents. Examples of binary solvent systems (i.e., containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a polymer gel as described herein can be any compound that facilitates the polymerization of the polymer precursors to form a polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance which dissolves or suspends reactants (e.g., polymer precursors) and provides a medium in which a reaction may occur. Examples of solvents useful in the preparation of the polymer gels and carbon materials disclosed herein include, but are not limited to, water, alcohols and mixtures thereof. Exemplary alcohols include ethanol, t-butanol, methanol and mixtures thereof. Such solvents are useful for dissolution of the synthetic polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying. Analogously, a "polymer cryogel" is a dried polymer gel that has been dried by freeze drying.

"RF cryogel" or "RF polymer cryogel" refers to a dried gel or dried polymer gel, respectively, that has been dried by freeze drying wherein the gel or polymer gel was formed from the catalyzed reaction of resorcinol and formaldehyde.

"Pyrolyzed cryogel" or "pyrolyzed polymer cryogel" is a cryogel or polymer cryogel, respectively, that has been pyrolyzed but not yet activated.

"Activated cryogel" or "activated polymer cryogel" is a cryogel or polymer cryogel, respectively, which has been activated to obtain activated carbon material.

"Xerogel" refers to a dried gel that has been dried by air drying, for example, at or below atmospheric pressure. Analogously, a "polymer xerogel" is a dried polymer gel that has been dried by air drying.

"Pyrolyzed xerogel" or "pyrolyzed polymer xerogel" is a xerogel or polymer xerogel, respectively, that has been pyrolyzed but not yet activated.

"Activated xerogel" or "activated polymer xerogel" is a xerogel or polymer xerogel, respectively, which has been activated to obtain activated carbon material.

"Aerogel" refers to a dried gel that has been dried by supercritical drying, for example, using supercritical carbon dioxide. Analogously, a "polymer aerogel" is a dried polymer gel that has been dried by supercritical drying.

"Pyrolyzed aerogel" or "pyrolyzed polymer aerogel" is an aerogel or polymer aerogel, respectively, that has been pyrolyzed but not yet activated.

"Activated aerogel" or "activated polymer aerogel" is an aerogel or polymer aerogel, respectively, which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about −10° C. Alternatively, the suitably cold medium can be a gas, liquid, or solid with a temperature below about −20° C. Alternatively, the suitably cold medium can be a gas, liquid, or solid with a temperature below about −30° C.

"Activate" and "activation" each refer to the process of heating a raw material or carbonized/pyrolyzed substance at an activation dwell temperature during exposure to oxidizing atmospheres (e.g. carbon dioxide, oxygen, or steam) to produce an "activated" substance (e.g. activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon or nitrogen) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution, and pore length. Generally the pore structure of activated carbon material comprises micropores and mesopores.

"Mesopore" generally refers to pores having a diameter between about 2 nanometers and about 50 nanometers while the term "micropore" refers to pores having a diameter less than about 2 nanometers. Mesoporous carbon materials comprise greater than 50% of their total pore volume in mesopores while microporous carbon materials comprise greater than 50% of their total pore volume in micropores. "Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to a conductor through which electricity enters or leaves an object, substance, or region.

"Binder" refers to a material capable of holding individual particles of carbon together such that after mixing a binder and carbon together the resulting mixture can be formed into sheets, pellets, disks or other shapes. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte, that is it does not absorb a significant amount of ions or change chemically, e.g., degrade.

"Conductive" refers to the ability of a material to conduct electrons through transmission of loosely held valence electrons.

"Electrolyte" means a substance containing free ions such that the substance is electrically conductive. Examples of electrolytes include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluoroborate), EMITFB (1 ethyl-3-methylim idazolium tetrafluoroborate), tetraethylammonium, triethylammonium based salts or mixtures thereof. In some embodiments, the electrolyte can be a water-based acid or water-based base electrolyte such as mild aqueous sulfuric acid or aqueous potassium hydroxide.

As noted above, the present disclosure provides in some embodiments, an energy storage material comprising a plurality of energy storage particles, wherein the plurality of energy storage particles comprises a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3. For example in some embodiments, the energy storage material is a carbon material.

In other embodiments, the correlation coefficient of the energy storage material, for example a carbon material, is 0.97 or greater or even 0.99 or greater.

In some other embodiments, the energy storage material is a carbon material, and the carbon material comprises a packing ratio of 0.97 or greater when formed into an electrode. For example, in some embodiments the carbon material comprises a packing ratio of 1.0 or greater, or even 1.1 or greater, when formed into an electrode.

In yet other embodiments, the energy storage material is a carbon material and the particle size distribution comprises particle sizes ranging from 0.01 µm to 20 µm. For example, in some embodiments the particle size distribution comprises particle sizes ranging from 0.03 µm to 17 µm or from 0.04 µm to 12 µm.

In some other embodiments, the energy storage material is a carbon material, and the carbon material is prepared by blending two or more different carbon samples, each carbon sample comprising a different particle size distribution. For example, in some embodiments the carbon material is prepared by blending three different carbon samples.

In some embodiments, the energy storage material is a carbon material, the carbon material is activated, and the carbon material comprises a plurality of activated carbon particles. In yet other embodiments, the carbon material comprises a plurality of activated carbon particles and a plurality of carbon black particles.

In yet other embodiments, the energy storage material is a carbon material, and the carbon material comprises a total impurity content of less than 500 ppm of elements having atomic numbers ranging from 11 to 92 as measured by proton induced x-ray emission.

In still other embodiments, the energy storage material is a carbon material, and the carbon material comprises a BET specific surface area of 1500 $m^2/g$ or greater, 2000 $m^2/g$ or greater or even 2400 $m^2/g$ or greater.

In other embodiments, the energy storage material is a carbon material, and the carbon material comprises a pore volume of at least 0.7 cc/g, at least 0.8 cc/g, at least 1.0 cc/g, at least 1.3 cc/g, at least 1.5 cc/g, at least 1.8 cc/g or at least 2.0 cc/g.

In some embodiments, the energy storage material comprises a plurality of carbon particles, wherein the carbon material comprises a trimodal particle size distribution. For example, in some embodiments the trimodal particle size distribution comprises particle size maxima at about 0.1 to about 0.2 µm, about 0.9 to about 1.0 µm and about 9 to about 10 µm.

In some embodiments, the energy storage material comprises a plurality of carbon particles, wherein the carbon material comprises a calendaring ratio of at least 40% for example at least 50% or at least 60%.

In some other embodiments of the present disclosure, an energy storage material is provided, the energy storage material comprising a plurality of energy storage particles, wherein the plurality of energy storage particles comprises a packing ratio of 0.97 or greater when formed into an electrode.

In some further embodiments of the foregoing, the energy storage material is a carbon material. For example, in some embodiments the carbon material comprises a packing ratio of 1.0 or greater when formed into an electrode.

In other embodiments, the disclosure provides a carbon material having a calendaring ratio of at least 40% when combined with a binder and formed into an electrode.

In still other embodiments, the disclosure provides a carbon material comprising a plurality of carbon particles, wherein the carbon particles comprise a trimodal particle size distribution having first, second and third particle size maxima, wherein the first particle size maxiumum is at about 0.1 to about 0.2 µm, the second particle size maximum is at about 0.9 to about 1.0 µm and the third particle size maximum is at about 9 to about 10 µm.

In other embodiments, the present disclosure provides a device comprising a carbon material, wherein the carbon material comprises a plurality of carbon particles, the plurality of carbon particles comprising a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3. For example, in some embodiments the device is an electric double layer capacitor (EDLC) device comprising;

a) a positive electrode and a negative electrode, wherein each of the positive and negative electrodes comprise the carbon material;
b) an inert porous separator; and
c) an electrolyte;

wherein the positive electrode and the negative electrode are separated by the inert porous separator.

In other embodiments, the device is an EDLC, and the EDLC device comprises a volumetric capacitance of 5.0 F/cc or greater as measured by constant current discharge from 2.7 V to 0.1 V with a 5 second time constant employing a 1.8 M solution of tetraethylammonium-tetrafluoroborate in acetonitrile electrolyte and a current density of 0.5 A/g. In some other embodiments of the foregoing, the volumetric capacitance is 10.0 F/cc or greater, 15.0 F/cc or greater, 20.0 F/cc or greater, 21.0 F/cc or greater, 22.0 F/cc or greater or 23.0 F/cc or greater.

In still other embodiments, the device is an EDLC, and the EDLC device comprises a gravimetric capacitance of 104 F/g or greater as measured by constant current discharge from 2.7 V to 0.1 V with a 5 second time constant employing a 1.8 M solution of tetraethylammonium-tetrafluoroborate in acetonitrile electrolyte and a current density of 0.5 A/g.

In some other embodiments, the device is an EDLC, and the correlation coefficient is 0.97 or greater or even 0.99 or greater.

In other embodiments, the device is an EDLC, and the carbon material comprises a packing ratio of 0.97 or greater when formed into the positive electrode or the negative electrode. For example, in some embodiments the carbon material comprises a packing ratio of 1.0 or greater, or even 1.1 or greater, when formed into the positive electrode or the negative electrode.

In some other embodiments, the device is an EDLC, and the particle size distribution comprises particle sizes ranging from 0.01 µm to 20 µm. In other embodiments, the particle size distribution comprises particle sizes ranging from 0.03 µm to 17 µm or from 0.04 µm to 12 µm.

In still other embodiments, the device is an EDLC, and the carbon material is prepared by blending two or more different carbon samples, each carbon sample comprising a different particle size distribution. For example, in some embodiments the carbon material is prepared by blending three different carbon samples.

In yet other embodiments, the device is an EDLC, and the carbon material is activated, and the carbon material comprises a plurality of activated carbon particles. In other embodiments, the energy storage material comprises a carbon material comprising a plurality of activated carbon particles and a plurality of carbon black particles.

In some embodiments, the device is an EDLC, and the carbon material comprises a total impurity content of less than 500 ppm of elements having atomic numbers ranging from 11 to 92 as measured by proton induced x-ray emission.

In some other embodiments, the device is an EDLC, and the carbon material comprises a BET specific surface area of 1500 $m^2/g$ or greater, 2000 $m^2/g$ or greater or even 2400 $m^2/g$ or greater.

In yet some other embodiments, the device is an EDLC, and the carbon material comprises a pore volume of at least 0.7 cc/g, at least 0.8 cc/g, at least 1.0 cc/g, at least 1.3 cc/g, at least 1.5 cc/g, at least 1.8 cc/g or at least 2.0 cc/g.

In some other embodiments, the device is a battery. For example, in some embodiments the battery is a lithium/carbon battery, lithium ion battery, lithium sulfur battery, zinc/carbon battery, lithium air battery or lead acid battery.

In other embodiments, the present disclosure provides an electrode comprising a carbon material and a binder, wherein the carbon material comprises a plurality of carbon particles, the plurality of carbon particles comprising a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3. In some embodiments, the electrode consists essentially of the carbon material and the binder, for example the electrode may comprise less than 0.1% conductivity enhancer.

In still other embodiments, the present disclosure is directed to an electrode consisting essentially of a binder and an amorphous carbon material having a surface area of at least 1,500 $M^2/g$. For example, in some embodiments the electrode comprises less than 0.1% conductivity enhancer.

In other embodiments, the disclosure provides a carbon based electrode having a volumetric capacitance of 15.0 F/cc or greater as measured by constant current discharge from 2.7 V to 0.1 V with a 5 second time constant employing a 1.8

M solution of tetraethylammonium-tetrafluoroborate in acetonitrile electrolyte and a current density of 0.5 A/g.

In yet more embodiments, the present disclosure provides an electrode having a thickness D μm and comprising a carbon material comprising a plurality of carbon particles, wherein the carbon particles have a packing ratio of at least 0.97 when combined with a binder and formed into an electrode, and the plurality of carbon particles comprises a trimodal particle size distribution comprised of a first collection of particles having a mean particle size A μm, a second collection of particles having a mean particle size B μm and a third collection of particles having a mean particle size C μm, wherein A:B and B:C are each between about 100:1 and 2:1 and D:A is between about 2:1 and 100:1.

In still other embodiments, the present disclosure provides a method for preparing a carbon material comprising a plurality of carbon particles, the plurality of carbon particles comprising a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3, the method comprising:

a) providing two or more carbon samples, each carbon sample comprising a unique particle size distribution; and b) blending the two or more carbon samples at a predetermined ratio to obtain the carbon material.

In some embodiments of the method, two or more carbon samples are prepared by milling. For example, in one embodiment at least one carbon sample is prepared by jet milling, while in other embodiments, at least one carbon sample is subjected to two or more jet milling treatments.

In some embodiments of the method, three carbon samples are blended to obtain the carbon material.

In other embodiments of the method, the predetermined ratio is calculated by:

a) determining the particle size distribution of each carbon sample; and b) using the determined particle size distribution of each carbon sample to calculate the ratio of each carbon sample required to obtain the maximum correlation coefficient.

A. Preparation of Carbon Materials

Carbon materials for use as energy storage particles may be prepared according to any number of methods. In one embodiment, the disclosed carbon materials are prepared by a sol gel process wherein a polymer gel is prepared by polymerization of one or more polymer precursors. The resulting polymer gel is then dried, for example by rapidly freezing polymer gel particles followed by lyophilization. The dried polymer gel is then pyrolyzed and optionally activated. The carbon sample thus obtained may then be milled to obtain a desired particle size distribution and then blended at a predetermined ratio with one or more other carbon samples having different particle size distributions to obtain a carbon material having enhanced packing properties. Similar methods of milling and blending may be employed with other types of energy storage particles to enhance the packing properties, and thus volumetric performance, of the same. Details of the preparation of carbon materials of the various embodiments are described below and in co-owned U.S. Pat. No. 7,723,262 and U.S. patent application Ser. No. 12/829,282 both of which are hereby incorporated by reference in their entirety.

1. Preparation of Polymer Gels

The polymer gels may be prepared by a sol gel process. For example, the polymer gel may be prepared by co-polymerizing one or more polymer precursors in an appropriate solvent. In one embodiment, the one or more polymer precursors are co-polymerized under acidic conditions. In some embodiments, a first polymer precursor is a phenolic compound and a second polymer precursor is an aldehyde compound. In another embodiment of the method, the phenolic compound is resorcinol, catechol, hydroquinone, phloroglucinol, phenol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phloroglucinol, phenol or a combination thereof, and the aldehyde compound is formaldehyde. In yet further embodiments, the phenolic compound is resorcinol and the aldehyde compound is formaldehyde.

The sol gel polymerization process is generally performed under catalytic conditions. Accordingly, in some embodiments, preparing the polymer gel comprises co-polymerizing one or more polymer precursors in the presence of a catalyst. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to phenolic compound may have an effect on the final properties of the polymer gel as well as the final properties of the carbon materials prepared therefrom. Thus, in some embodiments such catalysts are used in the range of molar ratios of 10:1 to 2000:1 phenolic compound:catalyst. In some embodiments, such catalysts can be used in the range of molar ratios of 20:1 to 200:1 phenolic compound:catalyst. For example in other embodiments, such catalysts can be used in the range of molar ratios of 25:1 to 100:1 phenolic compound:catalyst.

The reaction solvent is another process parameter that may be varied to obtain the desired properties of the polymer gels and carbon materials prepared therefrom. In some embodiments, the solvent for preparation of the polymer gel is a mixed solvent system of water and a miscible co-solvent. For example, in certain embodiments the solvent comprises a water miscible acid. Examples of water miscible acids include, but are not limited to, propionic acid, acetic acid, and formic acid. In further embodiments, the solvent comprises a ratio of water-miscible acid to water of 99:1, 90:10, 75:25, 50:50, 25:75, 10:90 or 1:90. In other embodiments, acidity is provided by adding a solid acid to the reaction solvent.

In some other embodiments of the foregoing, the solvent for preparation of the polymer gel is acidic. For example, in certain embodiments the solvent comprises acetic acid. For example, in one embodiment, the solvent is 100% acetic acid. In other embodiments, a mixed solvent system is provided, wherein one of the solvents is acidic. For example, in one embodiment of the method, the solvent is a binary solvent comprising acetic acid and water. In further embodiments, the solvent comprises a ratio of acetic acid to water of 99:1, 90:10, 75:25, 50:50, 25:75, 10:90 or 1:90. In other embodiments, acidity is provided by adding a solid acid to the reaction solvent.

In some embodiments of the methods described herein, the molar ratio of phenolic precursor to catalyst is from about 10:1 to about 2000:1 or the molar ratio of phenolic precursor to catalyst is from about 20:1 to about 200:1. In further embodiments, the molar ratio of phenolic precursor to catalyst is from about 25:1 to about 100:1. In further embodiments, the molar ratio of phenolic precursor to catalyst is from about 25:1 to about 50:1. In further embodiments, the molar ratio of phenolic precursor to catalyst is from about 100:1 to about 50:1.

In the specific embodiment wherein one of the polymer precursors is resorcinol and another polymer precursor is formaldehyde, the resorcinol to catalyst ratio can be varied to obtain the desired properties of the resultant polymer gel and carbon materials prepared therefrom. In some embodiments of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 25:1 to about 50:1. In further embodiments, the molar ratio of resorcinol to catalyst is from about 100:1 to about 50:1.

Polymerization to form a polymer gel can be accomplished by various means described in the art. For instance, polymerization can be accomplished by incubating suitable polymer precursor materials in the presence of a suitable catalyst for a period of time. The time for polymerization can be a period ranging from minutes or hours to days, depending on temperature (the higher the temperature the faster, the reaction rate, and correspondingly, the shorter the time required). The polymerization temperature can range from room temperature to a temperature approaching (but lower than) the boiling point of the starting solution. For example, the temperature can range from about 20° C. to about 90° C. In the specific embodiment wherein one polymer precursor is resorcinol and one polymer precursor is formaldehyde, the temperature can range from about 20° C. to about 100° C., typically from about 25° C. to about 90° C. In some embodiments, polymerization can be accomplished by incubation of suitable synthetic polymer precursor materials in the presence of a catalyst for at least 24 hours at about 90° C. Generally polymerization can be accomplished in between about 6 and about 24 hours at about 90° C., for example between about 18 and about 24 hours at about 90° C.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species. The relative amounts of alcohol-containing species (e.g. alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to carbonyl species may be selected so that the total moles of reactive alcohol groups in the alcohol containing species is approximately the same as the total moles of reactive carbonyl groups in the carbonyl species. The same general 1:1 molar ratio holds true when the carbonyl-containing species comprises a combination of an aldehyde species and a carbonyl species.

The total solids content in the aqueous solution prior to polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.4 to 1.

Examples of solvents useful in the preparation of the polymer gels disclosed herein include but are not limited to water or alcohol such as, for example, ethanol, t-butanol, methanol or mixtures of these, optionally further with water. Such solvents are useful for dissolution of the polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a polymer gel is prepared by a process that does not include solvent exchange.

Suitable catalysts in the preparation of polymer gels include volatile basic catalysts that facilitate polymerization of the precursor materials into a monolithic polymer. The catalyst can also comprise various combinations of the catalysts described above. In embodiments comprising phenolic compounds, such catalysts can be used in the range of molar ratios of 20:1 to 200:1 phenolic compound:catalyst. For example, in some specific embodiments such catalysts can be used in the range of molar ratios of 25:1 to 100:1 phenolic compound:catalyst.

2. Creation of Polymer Gel Particles

A monolithic polymer gel can be physically disrupted to create smaller particles according to various techniques known in the art. The resultant polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the polymer gel particles can be in the range below about 1 mm, for example, in the size range of about 10 to 1000 microns. Techniques for creating polymer gel particles from monolithic material include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art.

In a specific embodiment, a roller mill is employed. A roller mill has three stages to gradually reduce the size of the gel particles. The polymer gels are generally very brittle for a 'wet' material and are not damp to the touch. Consequently they are easily milled using this approach, however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

In one embodiment, a rotary crusher is employed. The rotary crusher has a screen mesh size of about $1/8^{th}$ inch. In another embodiment, the rotary crusher has a screen mesh size of about $3/8^{th}$ inch. In another embodiment, the rotary crusher has a screen mesh size of about $5/8^{th}$ inch. In another embodiment, the rotary crusher has a screen mesh size of about $3/8^{th}$ inch.

Milling can be accomplished at room temperature according to methods well known to those of skill in the art. Alternatively, milling can be accomplished cryogenically, for example by co-milling the polymer gel with solid carbon dioxide (dry ice) particles. In this embodiment, the two steps of (a) creating particles from the monolithic polymer gel and (b) rapid, multidirectional freezing of the polymer gel are accomplished in a single process.

3. Rapid Freezing of Polymer Gels

After the polymer gel particles are formed from the monolithic polymer gel, freezing of the polymer gel particles is accomplished rapidly and in a multi-directional fashion. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about −10° C. or lower, for example, −20° C. or lower, or for example, to at least about −30° C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transition from liquid to solid without further component concentration nor product cooling until complete freezing is achieved. In the specific case of water and acetic acid (which as pure substances exhibit freezing points of 0° C. and 17° C., respectively), the eutectic composition is comprised of approximately 59% acetic acid and 41% water and freezes at about −27° C. Accordingly, in one embodiment, the mixed solvent system is the eutectic composition, for example, in one embodiment the mixed solvent system comprises 59% acetic acid and 41% A water.

4. Drying of Polymer Gels

In one embodiment, the frozen polymer gel particles containing a fine ice matrix are lyophilized under conditions designed to avoid collapse of the material and to maintain fine surface structure and porosity in the dried product. Details of the conditions of the lyophilization are provided herein. Generally drying is accomplished under conditions where the temperature of the product is kept below a temperature that would otherwise result in collapse of the product pores, thereby enabling the dried material to retain an extremely high surface area.

One benefit of having an extremely high surface area in the dried product is the improved utility of the polymer gel for the purpose of fabrication of capacitors, energy storage devices, and other energy-related applications. Different polymer gel applications require variations in the pore size distribution such as different levels of micropore volume, mesopore volume, surface area, and pore size. By tuning the various processing parameters of the polymer gel, high pore volumes can be reached at many different pore sizes depending on the desired application.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments, prior to drying the aqueous content of the polymer gel is in the range of about 50% to about 99%. In certain embodiments, upon drying the aqueous content of the polymer cryogel is less than about 30%, alternatively less than about 20%, alternatively less than about 10%, alternately less than about 5% or less than about 2.5%.

5. Pyrolysis and Activation of Polymer Gels

The polymer gels may be further processed by pyrolysis and optional activation. In this respect, either dried or wet polymer gels (i.e., not dried) may be pyrolyzed. The resulting carbon materials comprise a high surface area. For example, in some embodiments of the present disclosure, a carbon material having a specific surface area of at least 150 m$^2$/g, at least 250 m$^2$/g, at least 400 m$^2$/g, at least 500 m$^2$/g, at least 600 m$^2$/g, at least 700 m$^2$/g, at least 800 m$^2$/g, at least 900 m$^2$/g, at least 1000 m$^2$/g, at least 1500 m$^2$/g, at least 2000 m$^2$/g, at least 2400 m$^2$/g, at least 2500 m$^2$/g or at least 3000 m$^2$/g is provided.

Generally, in the pyrolysis process, dried polymer gels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (i.e., the period of time during which the sample is at the desired temperature) is from about 0 minutes to about 120 minutes, from about 0 minutes to about 60 minutes, from about 0 minutes to about 30 minutes, from about 0 minutes to about 10 minutes, from about 0 to 5 minutes or from about 0 to 1 minute.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 500° C. to about 1800° C. In other embodiments pyrolysis dwell temperature ranges from about 550° C. to about 1200° C. In other embodiments pyrolysis dwell temperature ranges from about 600° C. to about 800° C. In other embodiments pyrolysis dwell temperature ranges from about 650° C. to about 900° C.

In some embodiments, the pyrolysis dwell temperature is varied during the course of pyrolysis. In one embodiment, the pyrolysis is carried out in a rotary kiln with separate distinct heating zones, the temperature for each zone is sequentially decreased from the entrance to the exit end of the rotary kiln tube. In one embodiment, the pyrolysis is carried out in a rotary kiln with separate distinct heating zones, the temperature for each zone is sequentially increased from entrance to exit end of the rotary kiln tube.

In some embodiments, the pyrolyzed carbon materials are not further activated, while in other embodiments the carbon materials are further activated to obtain an activated carbon material. Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, and oxygen. Activating agents may also include corrosive chemicals such as acids, bases or salts (e.g., phosphoric acid, potassium hydroxide, sodium hydroxide, zinc chloride, etc.). Other activating agents are known to those skilled in the art.

Generally, in the activation process, samples are weighed and placed in a rotary kiln, for which the automated gas control manifold is set to ramp at a 20° C. per minute. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. One skilled in the art will recognize that other activation temperatures, either lower or higher, may be employed.

In some embodiments, the activation time is between 1 minute and 48 hours. In other embodiments, the activation time is between 1 minute and 24 hours. In other embodiments, the activation time is between 5 minutes and 24 hours. In other embodiments, the activation time is between 1 hour and 24 hours. In further embodiments, the activation time is between 12 hours and 24 hours. In certain other embodiments, the activation time is between 30 min and 4 hours. In some further embodiments, the activation time is between 1 hour and 2 hours.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

6. Milling and Blending of Carbon Materials

As noted above, the disclosed carbon materials comprise improved particle packing properties. While not wishing to be bound by theory, it is believed that such improved particle packing is due, at least in part, to the specific particle size distribution of the carbon particles within the carbon material. Carbon samples comprising the desired particle size distributions can be prepared by any number of methods known in the art. In particular, the desired particle size distributions can be obtained by various milling techniques. The particle size distribution obtained from a particular milling operation is a function of the mill type, the parameters of the milling operation and/or the material being milled. The present inventors have found that all of these factors can be controlled to obtain the desired particle size distribution, and thus optimized packing, as described below.

In some embodiments, the disclosed carbon material is milled to an average particle size of about 10 microns. The milling may be performed using a jetmill operating in a nitrogen atmosphere. While not wishing to be bound by theory, it is believed that this fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber. As they grind against each other, the particles migrate towards the center where they eventually exit the grinding chamber once they have reached the appropriate dimensions.

In some embodiments, the desired particle size distribution is obtained by varying the length of time which the carbon material is subjected to milling conditions. In some other embodiments, rather than increasing the length of the milling operation, the carbon material may be milled in one operation and then isolated. The isolated carbon material may then be milled again under identical or different conditions to obtain a twice-milled carbon material. Such twice-milled carbon materials comprise particle size distributions different (e.g., larger percentage of smaller particles) from carbon samples which have been milled only once.

Other methods for obtaining the desired particle size distribution of the disclosed carbon materials include: ball milling, cryo-milling, bead milling, crushing and the like. Methods which sort and separate carbon particles having different dimensions, for example sieving or gas classification systems, may also be employed in the practice of the invention. Such methods are well known to those skilled in the art.

In some embodiments of the present disclosure, the carbon material is processed according to the above procedures to obtain a particle size distribution comprising carbon particles ranging from 0.01 µm to 50 µm, from 0.01 µm to 20 µm, from 0.03 µm to 17 µm or from 0.04 µm to 12 µm. Such particle size distributions can be determined using any number of techniques known to those skilled in the art. In one particular embodiment, the particle size distribution is determined by laser diffraction techniques. For example, the carbon particles may be suspended in an aqueous solution and the particle size distribution determined by laser diffraction.

While the above description uses activated carbon particles as an example, one skilled in the art will recognize that analogous processes may be employed to prepare other energy storage particles comprising improved packing properties.

B. Energy Storage Particles Having Improved Particle Packing Properties

Enhanced packing of energy storage particles, for example carbon particles, can be beneficial for a variety of applications. For example, activated carbon materials comprising high surface areas are routinely used in energy storage devices such as capacitors, particularly supercapacitors. Typically such high-surface area carbon materials tend to have low densities, and thus their capacitance on a volume basis (i.e., volumetric capacitance) is relatively low. For practical applications, capacitors require both high gravimetric and high volumetric capacitance. For devices that are constrained with respect to size, volumetric capacitance can be increased by more densely packing the activated carbon particles. Traditional milling of activated carbon materials yields powders having a distribution of particle sizes and a wide and random range of structures (i.e., non-spherical particle shapes). These characteristics limit the ability of activated carbon powders to be densely packed, thus limiting the volumetric capacitance that can be achieved by the same.

The present inventors have discovered that the density (i.e., particle packing) of carbon materials can be improved by blending different particle size distributions obtained from different carbon materials and/or from different milling operations. Since the particle size distributions in these various carbon materials can be different (e.g., location of the peak size and/or the spread between minimum and maximum particle size), blending of different carbon materials comprising different particle size distributions to obtain optimized packing can be quite difficult. The present inventors have solved this problem by employing computer aided application of the modified Andreason equation (Eq. 2) for blending two or more carbon samples comprising different particle size distributions to improve the packing and hence the volumetric performance of a capacitor comprising the blended carbon material. Such techniques and resulting carbon materials represent improvements over known techniques and carbon materials.

By controlling the particle size distribution of the carbon particles, enhanced packing of the particles can be achieved. To this end, a number of different models have been proposed for the optimum packing of multisized particles. Two equations in this regard are the formulas provided by Furnas (C. C. Furnas, "Grading Aggregates: I", Ind. Eng. Chem. 23:1052-58, 1931; F. O. Anderegg, "Grading Aggregates: II", Ind. Eng. Chem. 23:1058-64), and Andreassen (A. H. M. Andreasssen and J. Andersen, Kolloid Z. 50:217-228, 1931). Furnas' equation assumes the addition of particles of smaller and smaller size, while Andreassen's equation assumes the addition of particles of larger and larger size. Further, since the Furnas equation provides a theoretical distribution, while that of Andreassen is semi-empirical, the Andreassen equation has been criticized for implying an infinite distribution with no minimum particle size.

To address this shortcoming, a modified equation has been developed that links the Furnas and Andreassen equations, referred to as the "modified Andreassen equation" or the "Dinger-Funk equation" (D. R. Dinger and J. E. Funk, Interceram 41(5):332-334, 1992). While the Andreassen equation gives a straight line on a logarithmic plot, the modified Andreasssen equation gives a downward curvature since it takes into account a minimum particle size ($d_m$) of the distribution. The Andreassen equation (1) and the modified Andreassen equation (2) are presented below:

$$CPFT = \left(\frac{d}{D}\right)^q * 100 \quad \text{(Eq. 1)}$$

$$CPFT = \frac{(d^q - d_m^q)}{(D^q - d_m^q)} * 100 \quad \text{(Eq. 2)}$$

wherein
CPFT=Cumulative Percent Finer Than (Cumulative Finer Volume distribution);
d=Particle size;
$d_m$=Minimum particle size of the distribution;
D=Maximum particle size; and
q=Distribution coefficient ("q-value").

It should be noted that the above minimum particle size distributions are based on volumes. This requires that mixtures of powders with different densities be converted to volumes in order to give volume percent. An important feature of the modified Andreassen equation is influence of the q-value on packing. By computer simulations, the modified Andreassen equation describes 100% packing density for infinite distributions when the q-value is 0.37 or lower (D. R. Dinger and J. E. Funk, Interceram 42(3):150-152, 1993). Of course, as has also been described in the art, real-world systems are finite, and thus 100% packing density is only achievable in theory. For q-values about 0.37, some degree of porosity will be present. Thus, for optimum packing the q-value should not exceed 0.37 and typically ranges from 0.30 to 0.37 for densely packed materials.

One method for accessing the particle packing properties of a carbon material, or other energy storage material, is to compare a plot of the cumulative finer volume distribution vs. particle size for the carbon material to the modified Andreassen equation curve. The correlation coefficient (i.e., R value) of the carbon material curve relative to the modified Andreassen equation curve is an indicator of the extent of packing optimization within the carbon material. A correlation coefficient of 1.0 relative to the modified Andreassen equation curve would indicate that optimum packing of the carbon particles within the carbon material has been achieved. Accordingly, in one embodiment, the correlation coefficient of a plot of the cumulative finer volume distribution vs. particle size of a disclosed carbon material comprises a correlation coefficient of 0.90 or greater, 0.95 or greater, 0.96 or greater, 0.97 or greater, 0.98 or greater, 0.99 or greater or even 0.995 or greater relative to the modified Andreassen equation for the given particle size distribution.

Another measure of the particle packing properties of an energy storage material is the packing ratio when incorporated into an electrode. While this metric may not correlate directly with the data obtained by comparing the particle size distribution to the modified Andreassen equation, it serves as another means to assess the packing efficiency of energy storage particles. The packing ratio is a measure of the density of the finished electrode compared to the expected density based on the mass and volume of the electrode components. A packing ratio of 1.0 would indicate that optimized packing has been achieved. A packing ratio of less than one indicates that less than optimum packing has been achieved, and a packing ratio of greater than one indicates that packing is optimized beyond that expected based on the mass and volume of the combined electrode components.

Figure 13A:
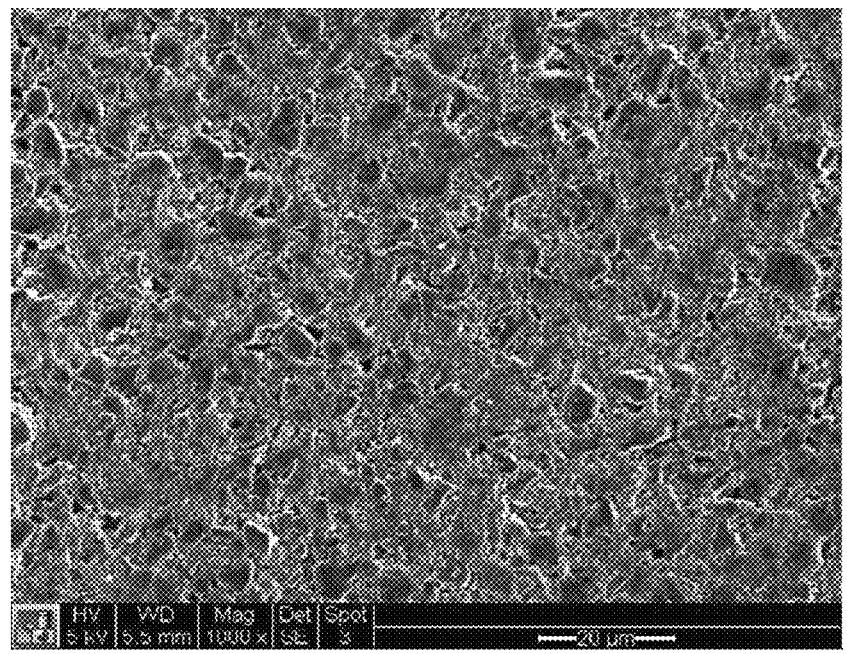
FIGS. 13A and 13B are TEM images of electrodes prepared with a control carbon and an optimized blended carbon, respectively.
Figure 13B:
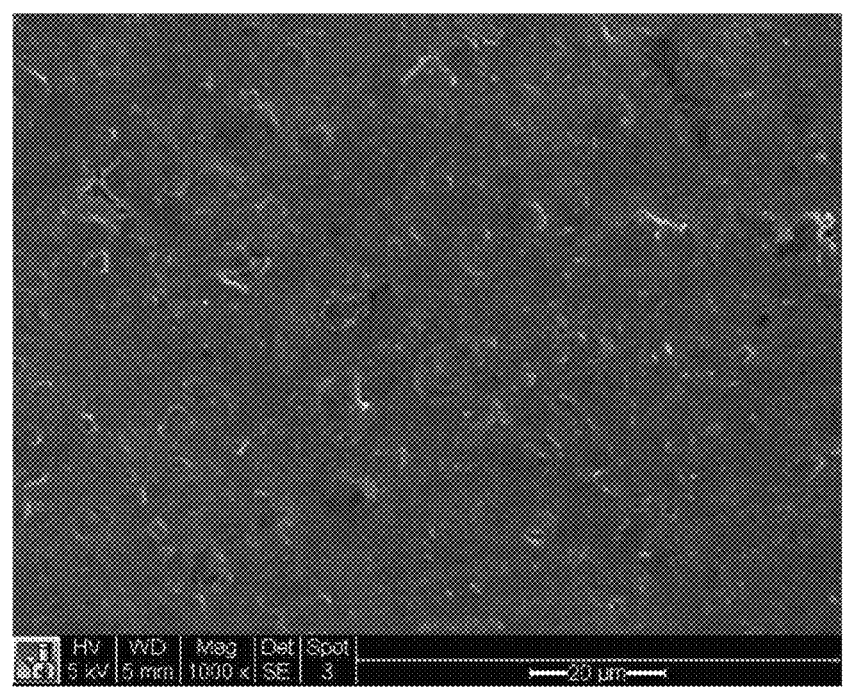

Surprisingly, the present inventors have found that in some embodiments when the particle size distribution is optimized according to the disclosed methods, the disclosed carbon materials comprise a high packing ratio when incorporated into an electrode. For example, FIGS. 13a and 13b are TEM images of electrodes prepared from a control carbon (13A) and a carbon having optimized particle packing properties (13B). The TEM images clearly show a higher carbon packing ratio in the optimized carbon versus the control carbon.

In some embodiments, the packing ratio of the disclosed carbon materials even exceeds 1.0. While not wishing to be bound by theory, one explanation for this unexpected result is that the unique mesoporosity of the carbon materials in combination with the particular particle size distributions of the carbon materials provides for insertion of carbon particles into the mesopores of the carbon material, thus increasing the packing ratio beyond 1.0. Such increased packing ratios provide for improved volumetric performance relative to carbon materials comprising a lower packing ratio. Accordingly, in some embodiments the disclosed carbon materials comprise packing ratios of 0.95 or greater, 0.97 or greater, 1.0 or greater, 1.05 or greater, 1.10 or greater, 1.15 or greater or 1.20 or greater.

In addition to an increased packing ratio, the present inventors have surprisingly discovered that carbon materials having optimized packing ratios as disclosed herein have advantageously high calendar ratios. The calendar ratio is determined as a ratio of the thickness of an electrode after it is calendared (i.e., rolled flat) compared to the thickness prior to calendaring (after coating and drying). For example, a calendar ratio of 50% indicates the thickness of the electrode has decreased by one-half upon calendaring. A higher calendaring ratio allows preparation of electrodes comprising more carbon per unit volume, and hence a higher energy density (i.e., volumetric capacity). Other known carbon electrodes materials cannot be calendared to such high calendar ratios and instead become brittle and delaminate from the electrode substrate. Accordingly, in some embodiments the presently disclosed carbon materials have a calendar ratio of at least 10%, at least 20%, at least 30%, at least 35%, at least 40%, at least 45%, at least 50%, at least 55% or at least 60%.

Figure 1B:
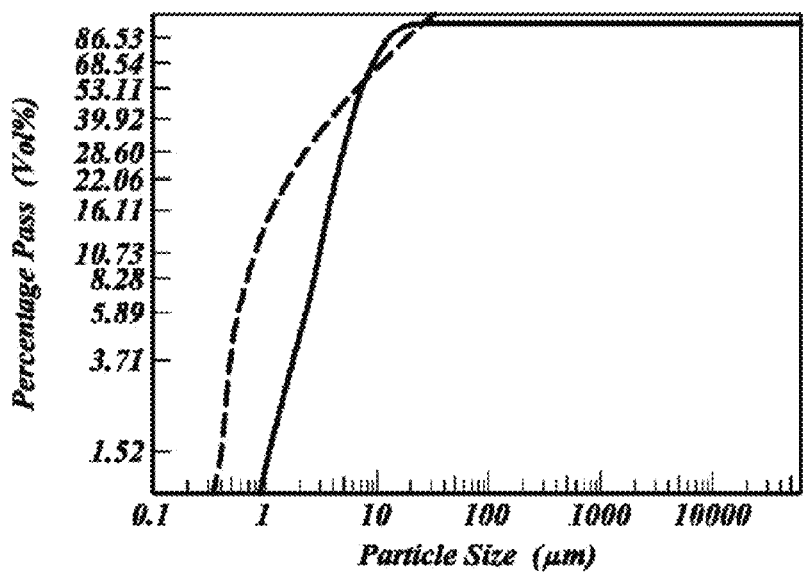
FIG. 1B shows that the measured PSD (solid-line) diverges from the optimal PSD (dashed-line) according to the modified Andreassen equation with a q value of 0.3.

FIGS. 1A and 1B present the data for a representative (prior art) particle size distribution for an activated carbon material (denoted Lot A) subjected to milling by methods known in the art. The particle size distribution of this sample is shown in FIG. 1A. Electrodes were produced from this milled, activated carbon, assembled into double layer ultracapacitors, and tested for electrochemical performance according to methods known in the art. The average weight of the electrode was 7.2 mg (average 14.4 for two electrodes) and a volume of 0.0201 $cm^3$. The packing ratio was calculated as measured electrode density (based on measured electrode weights and electrode size) divided by theoretical envelope density (calculated as 1 over the sum of measured BET total pore volume of 1.003 cc/g and carbon volume assuming 0.439 cc/g carbon density).

Referring to FIG. 1B, the dashed-line curve represents the line for particle size distribution that would achieve a modified Andreassen q-value of 0.3 (in range for optimal particle packing). The solid-line curve represents the measured particle size distribution of Lot A. As shown in FIG. 1B, the actual measured particle size distribution is significantly different from the theoretically optimal curve. For lot A, the correlation coefficient for the particle size data curve compared to the Andreasson curve was about 0.94.

Figure 2A:
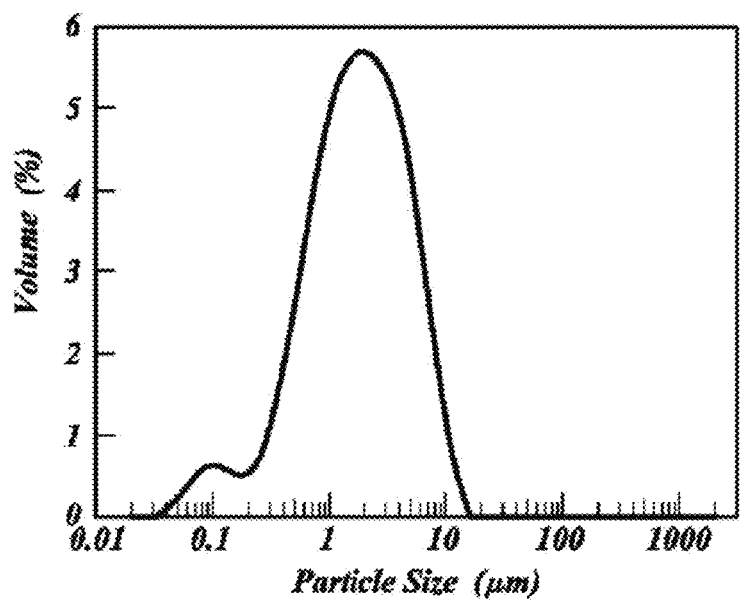
FIG. 2A shows the PSD of a milled, activated carbon material.
Figure 2B:
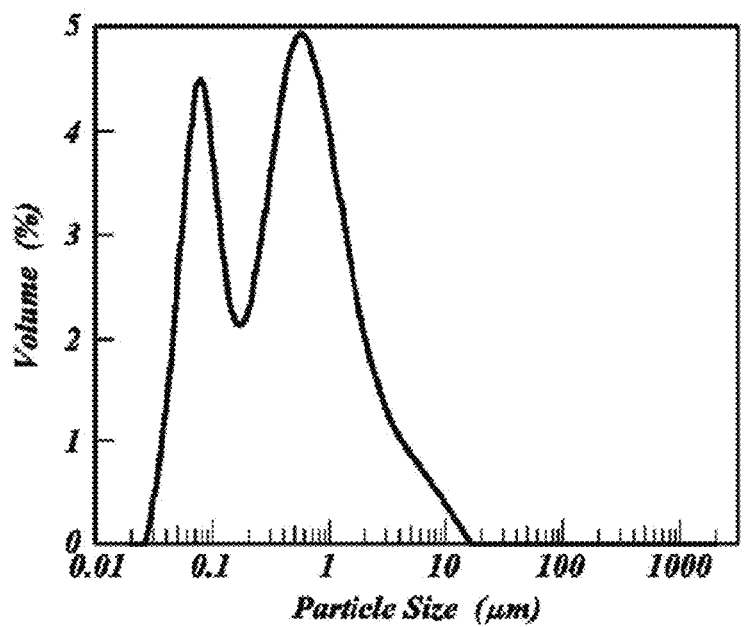
FIG. 2B shows the PSD of the milled, activated carbon material of FIG. 2A upon further milling.

The milled activated carbon material of FIG. 1A (Lot A) was then subject to additional milling by jet milling to yield Lot B. Lot B was then subjected to further jet milling to yield Lot C. FIGS. 2A and 2B show the PSD of Lot B and Lot C, respectively. Each additional milling step resulted in a further reduction in particle size and a different PSD. For Lot B, the correlation coefficient for the particle size data curve compared to the Andreasson curve was about 0.95.

Figure 3A:
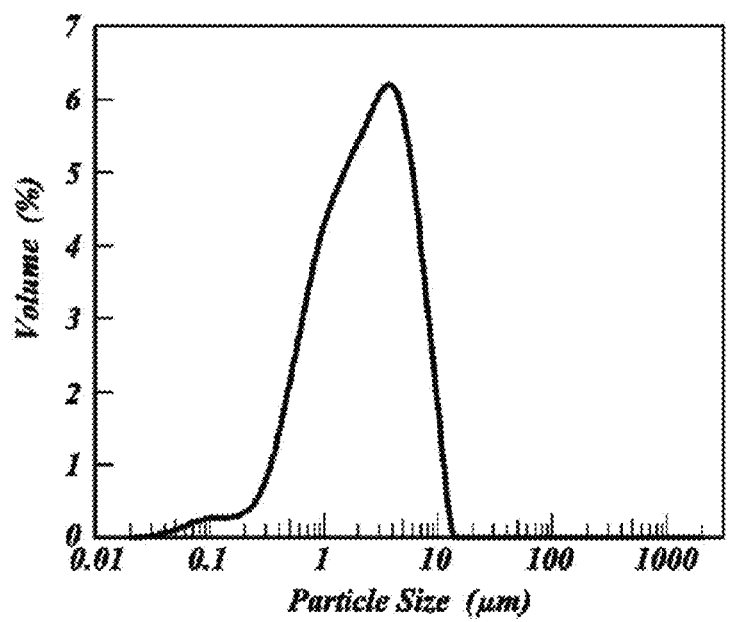
FIG. 3A shows the PSD of an approximately 40:60 blend of two different carbon materials.
Figure 3B:
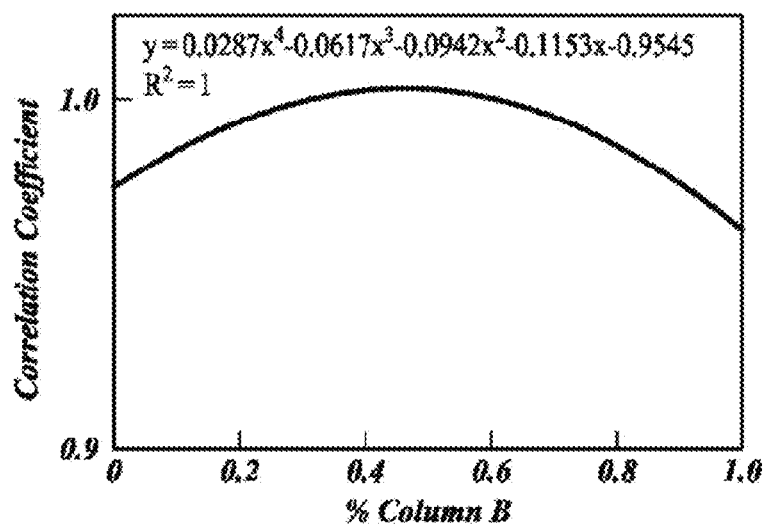
FIG. 3B shows the predicted correlation coefficient of a blended mixture at different blend ratios.

FIG. 3A shows the resulting PSD of an approximately 40:60 blend of Lot A and Lot B (the blended lot is denoted as Lot D). A plot of the predicted correlation coefficient calculated by the model vs. the ratio of Fraction of Lot A blended with lot B is presented in FIG. 3B. As can be seen, the incidence where the ratio is about 40-50% of Lot A blended with lot B provides for a maximization of the correlation coefficient (correlation coefficient achieved above about 0.98).

Figure 3C:
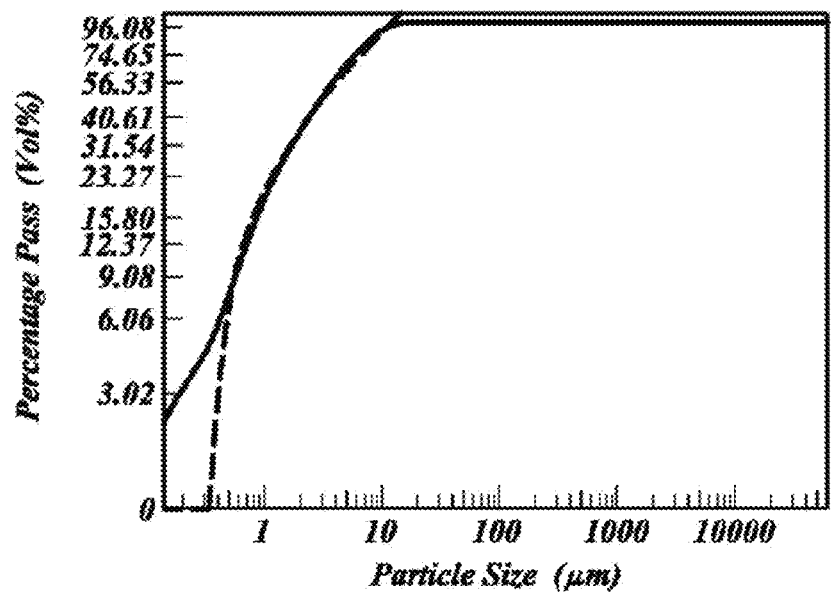
FIG. 3C shows that the measured PSD (solid-line) of the blend is approaching the optimal PSD (dashed-line) according to the modified Andreassen equation with a q value of 0.3.

Referring to FIG. 3C, the dashed-line curve represents the line for particle size distribution that would achieve a modified Andreassen q-value of 0.3 (in range for optimal particle packing). The solid-line curve represents the measured particle size distribution of the blended particles of Lot D. As shown in FIG. 3C, the actual measured particle size distribution is much closer to the optimal curve and has a correlation coefficient of about over 0.98 relative to the modified Andreassen equation curve. Significantly, there was an increase in packing density (1.16 for Lot D versus 1.01 for Lot A) and an increase in volumetric capacitance (20.6 F/cc @ 0.5 A/g for Lot D versus 19.0 F/cc for Lot A). Further details of the electrochemical data for some blended carbon materials are presented in Table 1.

TABLE 1

Electrochemical Testing of Carbon Materials Having Different Packing Densities

| No. | Elect. wt (mg +/− % STD) | Vol. Cap. (F/cc +/− % STD) (at 0.5, 1, 4 and 8 A/g, respectively) | | | | Grav. Cap. (F/g +/− % STD) (at 0.5, 1, 4 and 8 A/g, respectively) | | | |
|---|---|---|---|---|---|---|---|---|---|
| Lot A | 14.89 +/− 2.5 | 19.0 +/− 2.4 | 18.4 +/− 2.5 | 15.0 +/− 5.0 | 10.1 +/− 15.5 | 102.0 +/− 4.7 | 99.0 +/− 4.8 | 80.6 +/− 6.9 | 54.0 +/− 17.7 |
| Lot D | 15.8 +/− 2.9 | 20.6 +/− 3.8 | 19.7 +/− 3.0 | 14.7 +/− 3.1 | 9.2 +/− 16.9 | 104.5 +/− 0.9 | 99.8 +/− 0.1 | 77.4 +/− 6.0 | 47.0 +/− 19.7 |

Figure 4A:
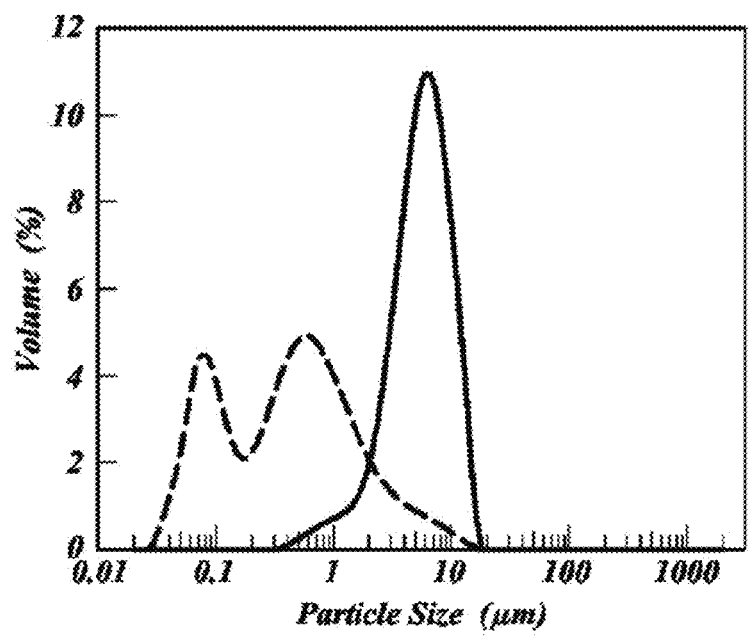
FIG. 4A is an overlay showing the PSD of the carbon material of FIG. 1A (solid-line) and the carbon material of FIG. 2B (dashed-line).
Figure 4B:
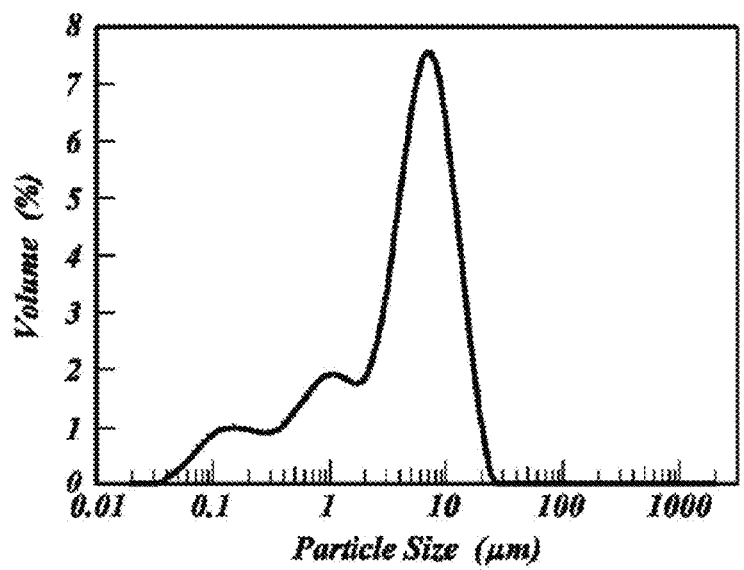
FIG. 4B shows the PSD of a blend of the carbon material of FIG. 1A and the carbon material of FIG. 2B.
Figure 4C:
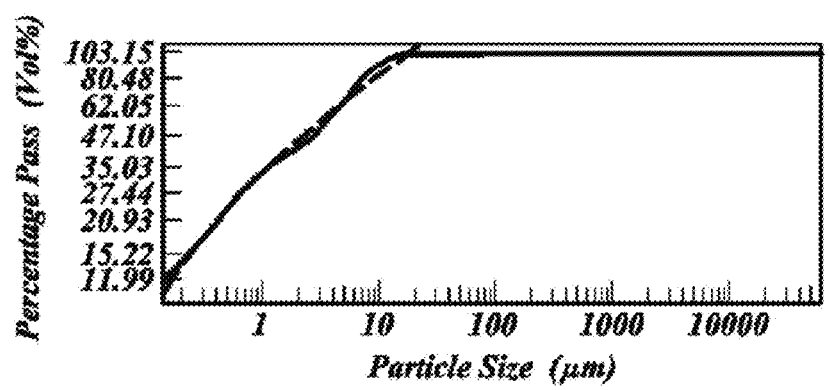
FIG. 4C shows that the measured PSD (solid-line) of the blend further approaches the optimal PSD (dashed-line) according to the modified Andreassen equation with a q value of 0.3.

FIG. 4A shows the particle size distribution of the individual components of a blend of particles comprised of about 40% Lot A (solid line) and 60% Lot C (dashed line), while FIG. 4B shows the resulting PSD of the blended particles (Lot E). Referring to FIG. 4C, the dashed-line curve represents the line for particle size distribution that would achieve a modified Andreassen q-value of 0.3 (in range for optimal particle packing). The solid-line curve represents the measured particle size distribution of the blended particles of Lot E. As shown in FIG. 4C, the actual measured particle size distribution closely follows the optimal curve and has a correlation coefficient of about 0.97 relative to the modified Andreassen equation curve. It was calculated that blends comprising in the range of 40:60 to 80:20 Lot A:Lot C provided correlation coefficients above about 0.97. It was further calculated that blends comprising in the range of 50:50 to 70:30 Lot A:Lot C provided correlation coefficients above about 0.98.

Figure 5A:
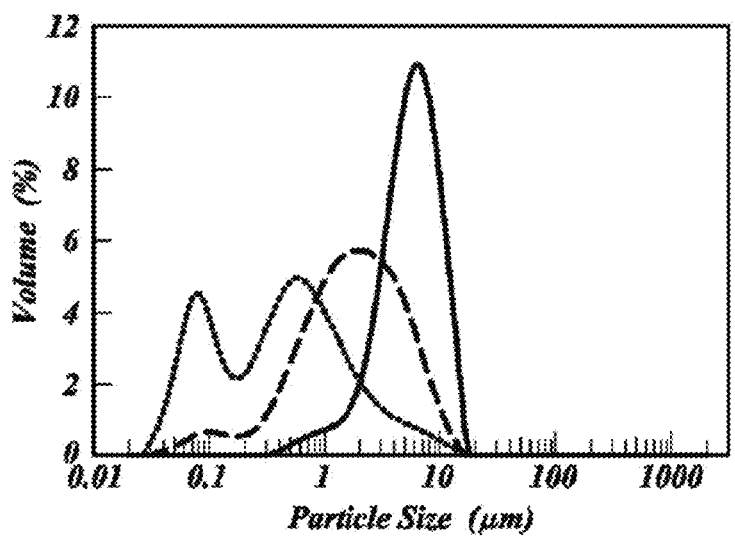
FIG. 5A is an overlay showing the PSD of the carbon material of FIG. 1A (solid-line), the carbon material of FIG. 2A (dashed-line) and the carbon material of FIG. 2B (dotted-line).
Figure 5B:
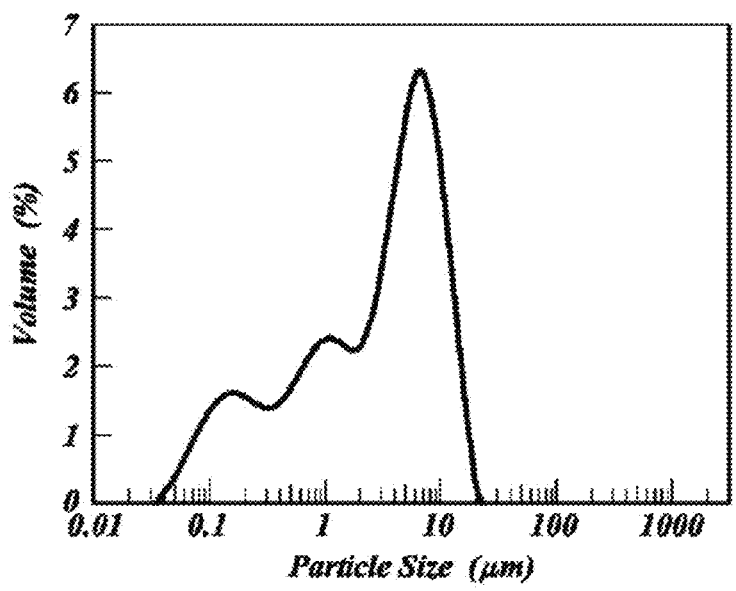
FIG. 5B shows the PSD of a blend of the carbon material of FIG. 1A, the carbon material of FIG. 2A and the carbon material of FIG. 2B.
Figure 5C:
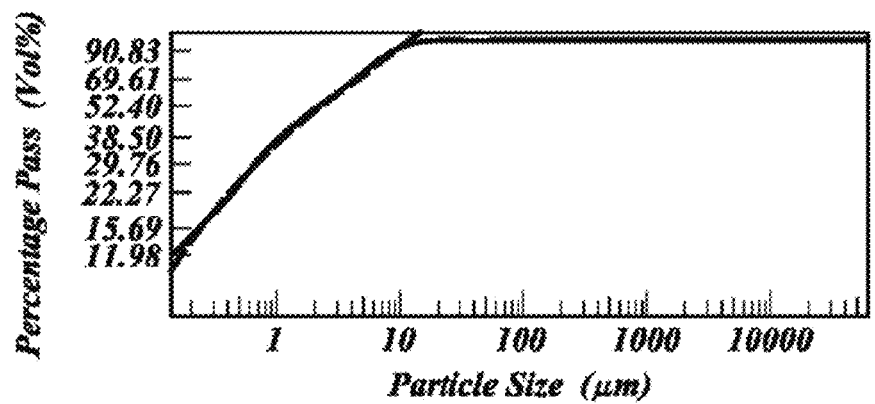
FIG. 5C shows that the measured PSD (solid-line) of the blend is close to the optimal PSD (dashed-line) according to the modified Andreassen equation with a q value of 0.3.

FIG. 5A shows the particle size distribution of the individual components of a blend of particles comprised of about 38% Lot A (solid line), 22% of Lot B (dashed line), and 40% Lot C (dotted line), while FIG. 5B shows the resulting PSD of the blended particles (Lot F). Referring to FIG. 5C, the dashed-line curve represents the line for particle size distribution that would achieve a modified Andreassen q-value of 0.3 (in range for optimal particle packing). The solid-line curve shows the measured particle size distribution of the blended particles of Lot F. As shown in FIG. 5C, actual measured particle size distribution closely follows the optimal curve.

The particle size distribution of the carbon materials is an important factor in their electrochemical performance. In some embodiments, the carbon materials comprise a plurality of carbon particles having particle sizes ranging from about 0.01 μm to about 50 μm. In other embodiments, the particle size distribution comprises particle sizes ranging from about 0.01 μm to about 20 μm. For example, in some embodiments the particle size distribution comprises particle sizes ranging from about 0.03 μm to about 17 μm or from about 0.04 μm to about 12 μm. In certain embodiments of the foregoing, at least 90%, at least 95% or at least 99% of the carbon particles having particles sizes in the range of about 0.01 μm to about 50 μm, about 0.01 μm to about 20 μm, about 0.03 μm to about 17 μm or about 0.04 μm to about 12 μm.

While not wishing to be bound by theory, it is believed that a trimodal particle size distribution similar to that shown in FIG. 5B provides for optimal particle packing, and thus energy density, of the carbon materials. Accordingly, one embodiment provides a carbon material having a particle size distribution as shown in FIG. 5B. For example, in some embodiments the carbon materials comprise a trimodal particle size distribution having first, second and third particle size maxima. The first particle size maximum may range from about 0.08 μm to about 0.2 μm, for example from about 0.09 μm to about 0.2 μm, from about 0.1 μm to about 0.2 μm or from about 0.1 μm to about 0.15 μm. The second particle size maximum may range from about 0.8 μm to about 2.0 μm, from about 0.8 μm to about 1.5 μm or from about 0.9 μm to about 1.0 μm. The third particle size maximum may range from about 7.0 μm to about 15.0 μm, from about 8.0 μm to about 12.0 μm or from about 9.0 μm to about 10.0 μm.

Alternatively, the particle size of the various carbons comprising the highly packed electrode can be described in terms of their size relative to the electrode thickness. For instance, a highly packed bimodal particle distribution comprised of particles with a first collection of particles of mean particle size A μm and a second collection of particles with mean size B μm and an electrode thickness C In one embodiment, the particles are comprised such that A:B is between about 100:1 and 2:1, for example between about 50:1 and 5:1, for example about 10:1; and C:A is between about 2:1 and 100:1, for example between about 2:1 and 10:1, for example about 5:1.

In another embodiment, the carbon materials comprise a highly packed trimodal particle distribution comprised of particles with a first collection of particles of mean particle size A μm and a second collection of particles with mean size B μm and a third collection of particles with mean size C μm and an electrode thickness D In one embodiment, the particles are comprised such that A:B and B:C are between about 100:1 and 2:1, for example between about 50:1 and 5:1, for example about 10:1; and D:A is between about 2:1 and 100:1, for example between about 2:1 and 10:1, for example about 5:1.

Applicants have also discovered the tap density of the carbon materials to be unexpectedly high. In this regard, the high tap densities are also believed to contribute, at least in part, to the unexpectedly high energy densities of the carbon materials. In some embodiments, the disclosed carbon material has a tap density between 0.2 and 0.6 g/cc, between 0.3 and 0.5 g/cc or between 0.4 and 0.5 g/cc. In another embodiment, the disclosed carbon material has a total pore volume of at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g, at least 1.6 cm$^3$/g, at least 1.7 cm$^3$/g, at least 1.8 cm$^3$/g, at least 1.9 cm$^3$/g or at least 2.0 cm$^3$/g.

Applicants have also discovered that the composition of matter described herein achieves unexpected increase to extremely high carbon surface area per unit volume. This surface area per unit volume is calculated as the product of the carbon specific surface area (for example, as determined from nitrogen sorption methodology) and the tap density. For example, applicants have found that the internal carbon surface area per unit volume can be increased from about 460 m$^2$/cc to about 840 m$^2$/cc, representing about an 83% increase over other known carbons.

The energy storage materials may comprise a mixture of different types of energy storage particles. For example, different types of energy storage particles include, but are not limited to, activated carbon, carbon black, graphite, lead, silicon, lithium, sulfur, Teflon and various oxides, for example lithium oxides. Accordingly, in one embodiment the energy storage material comprises a mixture of at least two different types of energy storage particles. The mixtures may comprise: activated carbon and carbon black, activated carbon and graphite, carbon black and graphite, activated carbon and lead, carbon black and lead, graphite and lead, activated carbon and silicon, carbon black and silicon, graphite and silicon, activated carbon and lithium, carbon black and lithium, graphite and lithium, activated carbon and sulfur, carbon black and sulfur, graphite and sulfur, activated carbon and metal oxide (e.g., lithium oxides), carbon black and metal oxide (e.g., lithium oxides), graphite and metal oxide (e.g., lithium oxides), activated carbon and Teflon®, carbon black and Teflon®, graphite and Teflon® or any combination thereof. One skilled in the art can readily derive other mixtures of energy storage particles which are useful in the context of the present disclosure.

C. Purity and Other Properties of the Disclosed Carbon Material

The disclosed methods for preparation of carbon materials provide for carbon materials having high purity. In some embodiments, the carbon materials are amorphous. Electrodes comprising carbon materials having residual levels of various impurities (e.g., chlorine, sulfur, metals, etc.) are known to decrease the breakdown voltage of the electrolyte in which the electrodes are immersed. Thus, these electrodes must be operated at lower voltages and have a shorter life span than devices comprising higher purity carbon. Impurities in carbon electrodes are also thought to contribute to degradation of other components within an EDLC or battery. For example the porous membrane which separates the two carbon electrodes in an EDLC may be degraded by chlorine or other impurities within the carbon electrode.

While not wishing to be bound by theory, it is believed that the purity of the disclosed carbon materials is a function of its preparation method, and variation of the preparation parameters may yield carbon materials having different properties. The purity of the disclosed carbon materials can be determined by any number of techniques known in the art. One particular method useful in carrying out the invention is proton induced x-ray emission (PIXE). This technique is very sensitive and capable of detecting the presence of elements having atomic numbers ranging from 11 to 92 (i.e., PIXE impurities) at the low PPM level. Methods for determining impurity levels via PIXE are well known in the art.

The disclosed carbon materials comprise low total PIXE impurities. Thus, in some embodiments the total PIXE impurity content in the disclosed carbon material (as measured by proton induced x-ray emission) is less than 1000 ppm. In other embodiments, the total PIXE impurity content in the disclosed carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the disclosed carbon material is a pyrolyzed dried polymer gel, a pyrolyzed polymer cryogel, a pyrolyzed polymer xerogel, a pyrolyzed polymer aerogel, an activated dried polymer gel, an activated polymer cryogel, an activated polymer xerogel or an activated polymer aerogel.

In addition to low PIXE impurity content, the disclosed carbon materials comprise high total carbon content. In addition to carbon, the disclosed carbon material may also comprise oxygen, hydrogen and nitrogen. In some embodiments, the disclosed carbon material comprises at least 85% carbon, at least 90% carbon, at least 95% carbon, at least 96% carbon, at least 97% carbon, at least 98% carbon or at least 99% carbon on a weight/weight basis. In some other embodiments, disclosed carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the disclosed carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the disclosed carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

The total ash content of a carbon material may, in some instances, have an effect on the electrochemical performance of a carbon material. Accordingly, in some embodiments, the ash content of the disclosed carbon material ranges from 0.1% to 0.001%, for example in some specific embodiments the ash content of the disclosed carbon material is less than 0.1%, less than 0.08%, less than 0.05%, less than 0.03%, than 0.025%, less than 0.01%, less than 0.0075%, less than 0.005% or less than 0.001%.

In other embodiments, the disclosed carbon material has a total PIXE impurity content of less than 500 ppm and an ash content of less than 0.08%. In further embodiments, the disclosed carbon material has a total PIXE impurity content of less than 300 ppm and an ash content of less than 0.05%. In other further embodiments, disclosed carbon material has a total PIXE impurity content of less than 200 ppm and an ash content of less than 0.05%. In other further embodiments, the disclosed carbon material has a total PIXE impurity content of less than 200 ppm and an ash content of less than 0.025%. In other further embodiments, the disclosed carbon material has a total PIXE impurity content of less than 100 ppm and an ash content of less than 0.02%. In other further embodiments, the disclosed carbon material has a total PIXE impurity content of less than 50 ppm and an ash content of less than 0.01%.

The amount of individual PIXE impurities present in the disclosed carbon materials can be determined by proton induced x-ray emission. Individual PIXE impurities may contribute in different ways to the overall electrochemical performance of the disclosed carbon materials. Thus, in some embodiments, the level of sodium present in the disclosed carbon material is less than 1000 ppm, less than 500 ppm, less than 100 ppm, less than 50 ppm, less than 10 ppm, or less than 1 ppm. In some embodiments, the level of magnesium present in the disclosed carbon material is less than 1000 ppm, less than 100 ppm, less than 50 ppm, less than 10 ppm, or less than 1 ppm. In some embodiments, the level of aluminum present in the disclosed carbon material is less than 1000 ppm, less than 100 ppm, less than 50 ppm, less than 10 ppm, or less than 1 ppm. In some embodiments, the level of silicon present in the disclosed carbon material is less than 500 ppm, less than 300 ppm, less than 100 ppm, less than 50 ppm, less than 20 ppm, less than 10 ppm or less than 1 ppm. In some embodiments, the level of phosphorous present in the disclosed carbon material is less than 1000 ppm, less than 100 ppm, less than 50 ppm, less than 10 ppm, or less than 1 ppm. In some embodiments, the level of sulfur present in the disclosed carbon material is less than 1000 ppm, less than 100 ppm, less than 50 ppm, less than 30 ppm, less than 10 ppm, less than 5 ppm or less than 1 ppm. In some embodiments, the level of chlorine present in disclosed carbon material is less than 1000 ppm, less than 100 ppm, less than 50 ppm, less than 10 ppm, or less than 1 ppm. In some embodiments, the level of potassium present in disclosed carbon material is less than 1000 ppm, less than 100 ppm, less than 50 ppm, less than 10 ppm, or less than 1 ppm. In other embodiments, the level of calcium present in the disclosed carbon material is less than 100 ppm, less than 50 ppm, less than 20 ppm, less than 10 ppm, less than 5 ppm or less than 1 ppm. In some embodiments, the level of chromium present in the disclosed carbon material is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the disclosed carbon material is less than 50 ppm, less than 20 ppm, less than 10 ppm, less than 5 ppm, less than 4 ppm, less than 3 ppm, less than 2 ppm or less than 1 ppm. In other embodiments, the level of nickel present in the disclosed carbon material is less than 20 ppm, less than 10 ppm, less than 5 ppm, less than 4 ppm, less than 3 ppm, less than 2 ppm or less than 1 ppm. In some other embodiments, the level of copper present in the disclosed carbon material is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the disclosed carbon material is less than 20 ppm, less than 10 ppm, less than 5 ppm, less than 2 ppm or less than 1 ppm. In yet other embodiments, the sum of all PIXE impurities, excluding sodium, magnesium, aluminum, silicon, phosphorous, sulphur, chlorine, potassium, calcium, chromium, iron, nickel, copper and zinc, present in the disclosed carbon material is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the disclosed carbon material comprises PIXE impurities near or below the detection limit of the proton induced x-ray emission analysis. For example, in some embodiments the disclosed carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the disclosed carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the disclosed carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, disclosed carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, disclosed carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed carbon materials comprise a high surface area. While not wishing to be bound by theory, it is thought that such high surface area may contribute, at least in part, to the high energy density obtained from devices comprising the carbon material. Accordingly, in some embodiment, the disclosed carbon material comprises a BET specific surface area of at least 150 m$^2$/g, at least 250 m$^2$/g, at least 400 m$^2$/g, at least 500 m$^2$/g, at least 600 m$^2$/g, at least 700 m$^2$/g, at least 800 m$^2$/g, at least 900 m$^2$/g, at least 1000 m$^2$/g, at least 1500 m$^2$/g, at least 2000 m$^2$/g, at least 2400 m$^2$/g, at least 2500 m$^2$/g, at least 2750 m$^2$/g or at least 3000 m$^2$/g. For example, in some embodiments of the foregoing, the disclosed carbon material is activated.

In another embodiment, the disclosed carbon material has a tap density between 0.2 and 0.6 g/cc, between 0.3 and 0.5 g/cc or between 0.4 and 0.5 g/cc. In another embodiment, the disclosed carbon material has a total pore volume of at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g or at least 1.6 cm$^3$/g.

The pore size distribution of the disclosed carbon materials is one parameter that may have an effect on their electrochemical performance. For example, a carbon material comprising pores sized to accommodate specific electrolyte ions may be particularly useful in EDLC devices. In addition, carbon materials comprising mesopores with a short effective length (i.e., less than 10 nm, less than 5, nm or less than 3 nm as measured by TEM) may be useful to enhance ion transport and maximize power. Accordingly, in one embodiment, the disclosed carbon material comprises a fractional pore volume of pores at or below 100 nm that comprises at least 50% of the total pore volume, at least 75% of the total pore volume, at least 90% of the total pore volume or at least 99% of the total pore volume. In other embodiments, the disclosed carbon material comprises a fractional pore volume of pores at or below 20 nm that comprises at least 50% of the total pore volume, at least 75% of the total pore volume, at least 90% of the total pore volume or at least 99% of the total pore volume.

In another embodiment, the disclosed carbon material comprises a fractional pore surface area of pores at or below 100 nm that comprises at least 50% of the total pore surface area, at least 75% of the total pore surface area, at least 90% of the total pore surface area or at least 99% of the total pore surface area. In another embodiment, the disclosed carbon material comprises a fractional pore surface area of pores at or below 20 nm that comprises at least 50% of the total pore surface area, at least 75% of the total pore surface area, at least 90% of the total pore surface area or at least 99% of the total pore surface area.

In another embodiment of the present disclosure, the disclosed carbon material is prepared by a method disclosed herein, for example, in some embodiments the disclosed carbon material is prepared by a method comprising pyrolyzing a dried polymer gel as disclosed herein. In some embodiments, the pyrolyzed polymer gel is further activated to obtain an activated carbon material.

The structural properties of the disclosed carbon materials may be measured using Nitrogen sorption at 17K, a method known to those of skill in the art. The Micromeretics ASAP 2020 may be used to perform detailed micropore and mesopore analysis. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

D. Use of the Disclosed Carbon Materials

The disclosed carbon materials can be used in devices requiring stable, high surface area micro- and mesoporous structure. Examples of applications for the disclosed carbon materials include, but are not limited to: energy storage and distribution devices, ultracapacitor electrodes, pseudocapacitor electrodes, battery electrodes, lithium ion anodes, lithium ion cathodes, lithium-carbon capacitor electrodes, lead acid battery electrodes, gas diffusion electrodes, including lithium-air electrodes and zinc-air electrodes, lithium ion batteries and capacitors (for example as cathode material), conducting current collectors/scaffolds for other active materials in electrochemical systems, nanostructured material support scaffolds, solid state gas storage (e.g., $H_2$ and $CH_4$ storage), adsorbents and as a carbon-based scaffold support structure for other catalytic functions such as hydrogen storage or fuel cell electrodes.

The disclosed carbon materials may also be employed in kinetic energy harvesting applications such as: hybrid electric vehicles, heavy hybrids, all electric drive vehicles, cranes, forklifts, elevators, electric rail, hybrid locomotives and electric bicycles. The carbon materials may also be employed in electrical back-up applications such as: UPS, data center bridge power, voltage dip compensation, electric brake actuators, electric door actuators, electronics, telecom tower bridge power. Applications requiring pulse power in which the carbon materials of this disclosure may be useful include, but are not limited to: boardnet stabilization, electronics including cell phones, PDAs, camera flashes, electronic toys, wind turbine blade pitch actuators, power quality/power conditioning/frequency regulation, electric supercharger. Yet other uses of the carbon materials includes use in automotive starting and stopping systems, power tools, flashlights, personal electronics, self contained solar powered lighting systems, RFID chips and systems, windfield developers for survey device power, sensors, pulse laser systems and phasers.

The disclosed carbon materials may also be used in applications where high purity is critical, for example, applications in the medical, electronic, chemical analysis, mems (micromachines), and biological fields. Chemical and electrochemical sensors or detectors of all kinds would experience less interference from impurities or experience fewer side reactions caused or catalyzed by impurities. Examples are impurities in air (explosives, hazardous chemicals, synthetic noses, or impurities in water such as organics or water impurities in organic liquids.

The acid/base nature of carbon is largely a function of impurities including chemisorbed oxygen. Thus, carbon materials are useful in applications where controlling the acid/base nature of the carbon material is desired.

Carbon is used as a reactant in the chemical production of materials and as an electrode in the electrochemical production of materials. Thus, the disclosed carbon materials find utility in the chemical and electrochemical production of high purity materials, especially metals. The disclosed carbon material may also be employed as an electrode in zinc-manganese oxide batteries (common flashlight batteries) and zinc-halogen batteries and incorporated into carbon-polymer composites for use as electrically conductive adhesives and seals and for minimizing radiation leakage.

1. Ultracapacitor Devices

EDLCs use electrodes immersed in an electrolyte solution as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions thus forming double layers of charges at the interfaces between the electrodes and the electrolyte.

When electric potential is applied between a pair of electrodes of an EDLC, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the EDLCS through orientation and alignment of molecules of the electrolytic solution under influence of the electric field induced by the potential. This mode of energy storage, however, is secondary.

EDLCS comprising the disclosed carbon material, for example can be employed in various electronic devices where high power is desired. Accordingly, in one embodiment an electrode comprising the disclosed carbon materials is provided. In another embodiment, an ultracapacitor comprising an electrode comprising the disclosed carbon materials is provided.

The disclosed carbon materials find utility in any number of electronic devices, for example wireless consumer and commercial devices such as digital still cameras, notebook PCs, medical devices, location tracking devices, automotive devices, compact flash devices, mobiles phones, PCMCIA cards, handheld devices, and digital music players. Ultracapacitors are also employed in heavy equipment such as: excavators and other earth moving equipment, forklifts, garbage trucks, cranes for ports and construction and transportation systems such as buses, automobiles and trains.

As noted above, the present disclosure provides carbon materials particularly suited for improved volumetric performance when incorporated into electrical storage and distribution devices (e.g., EDLCs). Accordingly, in one embodiment, an ultracapacitor device comprising the disclosed carbon material having improved volumetric performance is provided. In one embodiment, the ultracapacitor comprising the disclosed carbon material comprises a gravimetric capacitance in an organic electrolyte of at least 90 F/g, at least 100 F/g, at least 102 F/g, at least 104 F/g, at least 106 F/g, at least 108 F/g, at least 110 F/g, at least 115 F/g, at least 120 F/g, at least 125 F/g or at least 130 F/g or at least 140 F/g, or at least, 150 F/g, or at least 160 F/g. In another embodiment, an ultracapacitor device comprising the carbon material comprises a volumetric capacitance in an organic electrolyte of at least 10 F/cc, at least 15 F/cc, at least 18 F/cc, at least 20 F/cc, at least 21 F/cc, at least 22 F/cc, at least 23 F/cc, at least 24 F/cc, at least 25 F/cc, at least 27 F/cc, at least 30 F/cc or at least 35 F/cc. In some embodiments of the foregoing, the gravimetric capacitance and volumetric capacitance are measured by constant current discharge from 2.7 V to 0.1 V with a 5-second time constant and employing a 1.8 M solution of tetraethylammonium-tetrafluroroborate in acetonitrile (1.8 M TEATFB in AN) electrolyte and a current density of 0.5 A/g, 1.0 A/g, 4.0 A/g or 8.0 A/g.

In another embodiment, an ultracapacitor device comprising the disclosed carbon material comprises a gravimetric power in an acetonitrile based electrolyte of at least 10 W/g, at least 15 W/g, at least 20 W/g, at least 25 W/g, at least 30 W/g or at least 35 W/g. In another embodiment, an ultracapacitor device comprising the disclosed carbon material comprises a volumetric power in an acetonitrile based electrolyte of at least 5 W/cc, at least 10 W/cc, at least 15 W/cc, at least 20 W/cc, at least 25 W/cc or at least 30 W/cc. In another embodiment, an ultracapacitor device comprising the disclosed carbon material comprises a gravimetric energy in an organic electrolyte of at least 2.5 Wh/kg, at least 5.0 Wh/kg, at least 7.5 Wh/kg, at least 10 Wh/kg, at least 12.5 Wh/kg, at least 15.0 Wh/kg, at least 17.5. Wh/kg, at least 20.0 Wh/kg, at least 22.5 wh/kg or at least 25.0 Wh/kg. In another embodiment, an ultracapacitor device comprising the disclosed carbon material comprises a volumetric energy in an organic electrolyte of at least 1.5 Wh/liter, at least 3.0 Wh/liter, at least 5.0 Wh/liter, at least 7.5 Wh/liter, at least 10.0 Wh/liter, at least 12.5 Wh/liter, at least 15 Wh/liter, at least 17.5 Wh/liter, at least 20.0 Wh/liter, at least 25.0 Wh/liter or at least 30.0 Wh/liter.

In some embodiments of the foregoing, the gravimetric power, volumetric power, gravimetric energy and volumetric energy of an ultracapacitor device comprising the disclosed carbon material are measured by constant current discharge from 2.7 V to 1.89 V employing a 1.0 M solution of tetraethylammonium-tetrafluroroborate in acetonitrile (1.0 M TEATFB in AN) electrolyte and a 0.5 second time constant.

In one embodiment, an ultracapacitor device comprising the disclosed carbon material comprises a gravimetric power of at least 25 W/g, a volumetric power of at least 10.0 W/cc, a gravimetric energy of at least 5.0 Wh/kg and a volumetric energy of at least 3.0 Wh/L.

In another embodiment, an ultracapacitor device comprising the disclosed carbon material comprises a gravimetric power of at least 15 W/g, a volumetric power of at least 10.0 W/cc, a gravimetric energy of at least 20.0 Wh/kg and a volumetric energy of at least 12.5 Wh/L.

In some embodiments, EDLC electrodes are prepared by blending the disclosed carbon material with a fibrous Teflon binder (3% by weight) to hold the carbon particles together in a sheet. The carbon Teflon mixture is kneaded until a uniform consistency is reached. Then the mixture is rolled into sheets using a high-pressure roller-former that results in a final thickness of 50 microns. These electrodes are punched into discs and heated to 195° C. under a dry argon atmosphere to remove water and/or other airborne contaminants. The electrodes are weighed and their dimensions measured using calipers.

In some embodiments, the electrodes advantageously do not require use of a conductivity enhancer for optimum energy density. Accordingly, certain electrodes according to the present disclosure consist essentially of the disclosed blended carbon materials and a binder. For example, certain electrodes may comprise less than 1% conductivity enhancer or even less than 0.1% conductivity enhancer. The present inventors believe this is the first example of a carbon electrode having such high energy densities without use of a conductivity enhancer.

The carbon electrodes of the EDLCs are wetted with an appropriate electrolyte solution. Examples of solvents for use in electrolyte solutions for use in the devices of the present application include but are not limited to propylene carbonate, ethylene carbonate, butylene carbonate, dimethyl carbonate, methyl ethyl carbonate, diethyl carbonate, sulfolane, methylsulfolane and acetonitrile. Such solvents are generally mixed with solute, including, tetralkylammonium salts such as TEATFB (tetraethylammonium tetrafluoroborate); TEMATFB (tri-ethyl, methylammonium tetrafluoroborate); EMITFB (1-ethyl-3-methylim idazolium tetrafluoroborate), tetramethylammonium or triethylammonium based salts. In some other embodiments, the electrolyte can be a water based acid or base electrolyte such as mild sulfuric acid or potassium hydroxide.

In some embodiments, the electrodes are wetted with a 1.0 M solution of tetraethylammonium-tetrafluroroborate in acetonitrile (1.0 M TEATFB in AN) electrolyte. In other embodiments, the electrodes are wetted with a 1.0 M solution of tetraethylammonium-tetrafluroroborate in propylene carbonate (1.0 M TEATFB in PC) electrolyte. These are common electrolytes used in both research and industry and are considered standards for assessing device performance. In other embodiments, the symmetric carbon-carbon (C—C) capacitors are assembled under an inert atmosphere, for example, in an Argon glove box, and a NKK porous membrane 30 micron thick serves as the separator. Once assembled, the samples may be soaked in the electrolyte for 20 minutes or more depending on the porosity of the sample.

In some embodiments, the capacitance and power output are measured using cyclic voltametry (CV), chronopotentiometry (CP) and impedance spectroscopy at various voltages (ranging from 1.0-2.5 V maximum voltage) and current levels (from 1-10 mA) on an Biologic VMP3 electrochemical workstation. In these embodiments, the capacitance may be calculated from the discharge curve of the potentiogram using the formula:

$$C = \frac{I \times \Delta t}{\Delta V} \quad \text{(Eq. 3)}$$

where I is the current (A) and $\Delta V$ is the voltage drop, $\Delta t$ is the time difference. Because in this embodiment the test capacitor is a symmetric carbon-carbon (C—C) electrode, the specific capacitance is determined from:

$$C_s = 2C/m_e \quad \text{(Eq. 4)}$$

where $m_e$ is the mass of a single electrode. The specific energy and power may be determined using:

$$E_s = \frac{1}{4}\frac{CV_{max}^2}{m_e} \quad \text{(Eq. 5)}$$

$$P_s = E_s/4ESR \quad \text{(Eq. 6)}$$

where C is the measured capacitance $V_{max}$ is the maximum test voltage and ESR is the equivalent series resistance obtained from the voltage drop at the beginning of the discharge. ESR can alternately be derived from impedance spectroscopy.

2. Batteries

The disclosed energy storage materials comprising optimized packing properties also find utility as electrodes in any number of types of batteries. Batteries generally comprise powdered energy storage materials in the form of an electrode. Such powdered energy storage materials include, for example, activated carbon, graphite, mesoporous carbon, titanate, silicon lithium compounds, germanium lithium compounds, aluminum lithium compounds, lithium cobalt oxide, lithium manganese oxides, lithium nickel oxides, lithium iron phosphate, various alloys of the above materials, mixtures of carbon and sulfur and mixtures of lithium and iron phosphate. Improved packing of these battery materials is expected to improve the performance of the battery.

Any number of other batteries, for example, zinc-carbon batteries, lithium/carbon batteries, lithium ion batteries, lithium sulfur batteries, lead acid batteries and the like are also expected to perform better if the particle packing properties of the energy storage particles is optimized. Accordingly, in another embodiment the present invention provides a battery, in particular a zinc/carbon, a lithium/carbon, a lithium ion, lithium sulfur or a lead acid battery comprising a carbon material comprising optimized particles packing properties. In some embodiments, the battery is a lithium ion battery comprising oxide particles in the cathode and carbon particles in the anode. One skilled in the art will recognize other specific types of batteries, for example other carbon containing batteries, which will benefit from the disclosed optimized packing of energy storage particles.

EXAMPLES

The carbon materials disclosed in the following Examples were prepared according to the methods disclosed herein. Chemicals were obtained from commercial sources at reagent grade purity or better and were used as received from the supplier without further purification.

Unless indicated otherwise, the following conditions were generally employed. Phenolic compound and aldehyde were reacted in the presence of a catalyst in a binary solvent system (e.g., water/acetic acid). The molar ratio of phenolic compound to aldehyde was typically 0.5 to 1. The reaction was allowed to incubate in a sealed glass ampoule at 90° C. for at least 24 hours or until gelation was complete. The resulting polymer hydrogel contained water, but no organic solvent; and was not subjected to solvent exchange of water for an organic solvent, such as t-butanol. The polymer hydrogel monolith was then physically disrupted, for example by milling, to form polymer hydrogel particles having an average diameter of less than about 30 mm. The particles were then rapidly frozen, generally by immersion in a cold fluid (e.g., liquid nitrogen or ethanol/dry ice) and lyophilized. Generally, the lyophilizer shelf was pre-cooled to −50° C. before loading a tray containing the frozen polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10° C. Alternatively, the shelf temperature can be set higher, for example in the range of +25 to +40° C.

The dried polymer hydrogel was typically pyrolyzed by heating in a nitrogen atmosphere at temperatures ranging from 800-1200° C. for a period of time as specified in the examples. Activation conditions generally comprised heating a pyrolyzed polymer hydrogel in a $CO_2$ atmosphere at temperatures ranging from 900-1000° C. for a period of time as specified in the examples. Specific pyrolysis and activation conditions were as described in the following examples.

Example 1

Preparation of Polymer Gels

According to the methods disclosed herein, a polymer gel was prepared from a binary solvent system comprised of water and acetic acid (75:25), resorcinol, formaldehyde, and ammonium acetate. The material was then placed at elevated temperature to allow for gellation to create a polymer gel. Polymer gel particles were then created from the polymer gel and passed through a 4750 micron mesh sieve. The polymer gel particles were frozen by immersion in liquid nitrogen, loaded into a lyophilization tray at a loading of 3 to 7 g/in$^2$ and lyophilized. The time to dry (as inferred from time for product to reach within 2° C. of shelf temperature) was related to the product loading on the lyophilizer shelf.

The surface area of the dried gel was examined by nitrogen surface analysis using a Micromeritics Surface Area and Porosity Analyzer (model TriStar II). The measured specific surface area using the BET approach was in the range of about 500 to 700 m$^2$/g.

Example 2

Pyrolysis of Polymer Gels

Polymer gels prepared according to Example 1 were pyrolyzed via incubation at 900° C. in a nitrogen atmosphere for a dwell time of 60 min. The weight loss upon pyrolysis was 53±3%. In general, the specific surface area of the pyrolyzed gel was similar to that for the dried polymer gel before pyrolysis.

Example 3

Preparation of Activated Carbon Samples

Activated carbon samples were prepared from the pyrolyzed samples prepared according to Example 2. The pyrolyzed carbon samples were activated by multiple passes through a rotary kiln (alumina tube with 2.75 in inner diameter) at 900° C. under a $CO_2$ flow rate of 30 L/min, resulting in a total weight loss of about 45%.

The surface area of the activated carbon was examined by nitrogen surface analysis using a surface area and porosity analyzer. The measured specific surface area using the BET approach was in the range of about 1600 to 2000 $m^2/g$.

Example 4

Preparation of Carbon Electrodes Having Optimized Carbon Particle Packing

Figure 6:
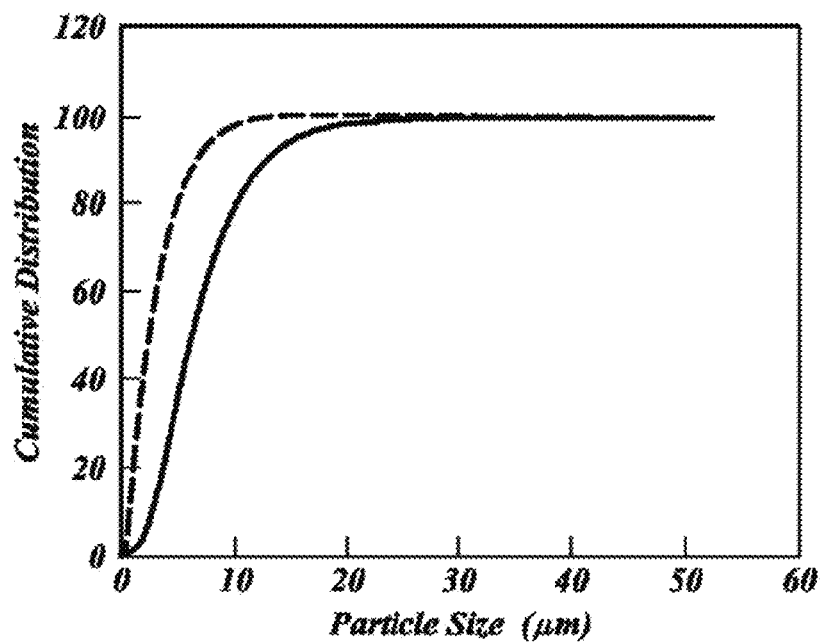
FIG. 6 shows the particle size distribution of two different milled carbon samples.

Activated carbon was prepared as described in Example 3 and jet milled to produce two distinctly different particle size distributions. The particle size distributions of the two different samples (Fractions A (solid line) and B (dashed line)) are shown in FIG. 6.

A mathematical model was constructed to model blending these two particle size distributions by calculating the particle size distribution for the blend and calculating the correlation coefficient of the blend relative to the modified Andreassen equation for the particle size distribution (q=0.3). In this context, the correlation coefficient comparing the two curves has the usual definition known in the art as a measure of the degree of interrelationship which exists between two curves, wherein r=1 represents ideal matching.

Figure 7:
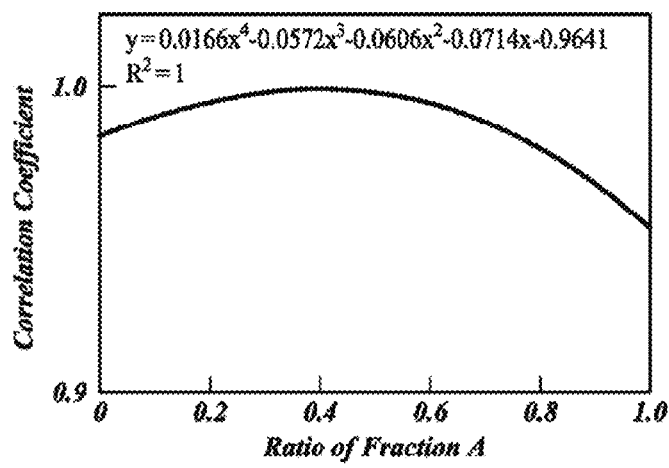
FIG. 7 shows the calculated correlation coefficient of a blended carbon material relative to the modified Andreassen equation at different blend ratios.

A plot of the correlation coefficient calculated by the model vs. the ratio of Fraction A is presented in FIG. 7. As can be seen, for the individual Fraction A material (case where Fraction A=1.0), the correlation coefficient was about 0.93. For this case, electrodes were produced, assembled into EDLCs and the electrochemical performance was measured. In this case, the electrode density achieved was 0.775 g/cc, whereas the theoretical maximum electrode density (assuming total absence of any inter-particle void volume) was calculated as 0.845, resulting in an achieved packing ratio of about 0.92. This material exhibited a volumetric capacitance of 19.1, 18.1, 12.7, and 7.2 F/cc at 0.5, 1, 4 and 8 A/g current density, respectively.

As Fraction B material was blended with Fraction A materials, there was an increase in the calculated correlation coefficient relative to the Andreassen curve, with the maximum correlation coefficient of about 0.97 at a Fraction A value of 0.4. To test if improved packing could be achieved in practice, a carbon sample was prepared comprising a physical mixture of 0.4 parts Fraction A and 0.6 parts of Fraction B. In this case, the electrode density achieved was 0.836 g/cc, whereas the theoretical maximum electrode density (assuming total absence of any inter-particle void volume) was calculated as 0.845, resulting in an achieved packing ratio of about 0.99. Compared to the Fraction A materials, the optimally blended 40:60 Fraction A:Fraction B material exhibited a markedly improved volumetric performance. Specifically, this material exhibited a volumetric capacitance of 21.3, 20.0, 18.1, and 12.7 F/cc at 0.5, 1, 4 and 8 A/g current density, respectively. Electrodes were tested in 1.8 M tetraethylene ammonium tetrafluoroborate in acetonitrile electrolyte.

Example 5

Preparation of Carbon Samples Having Optimized Packing

Figure 8:
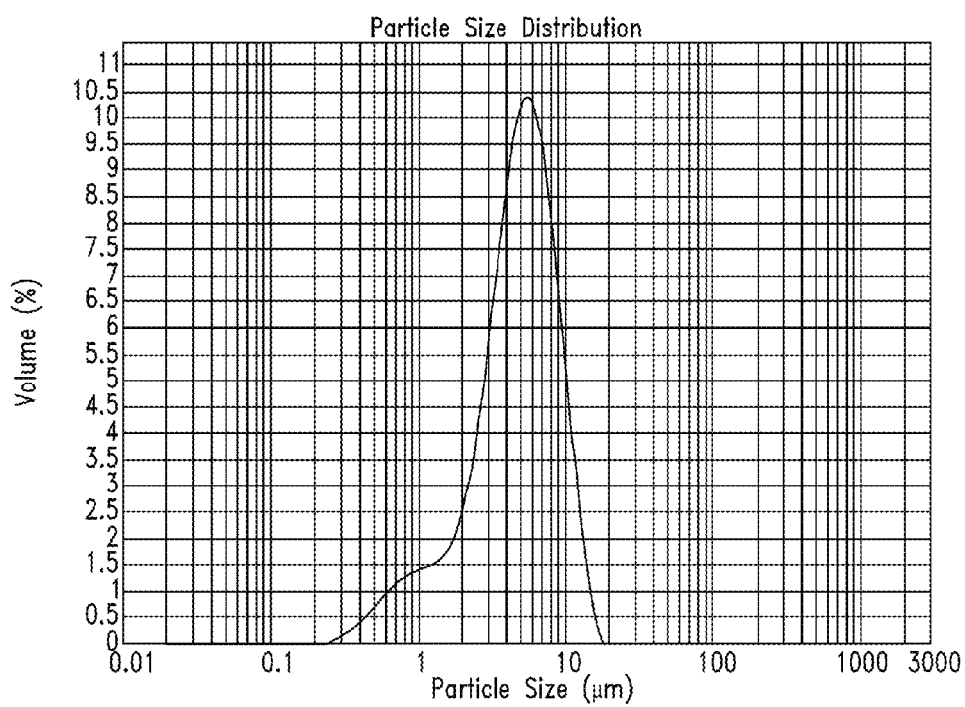
FIG. 8 is the particle size distribution of a control carbon sample.
Figure 9:
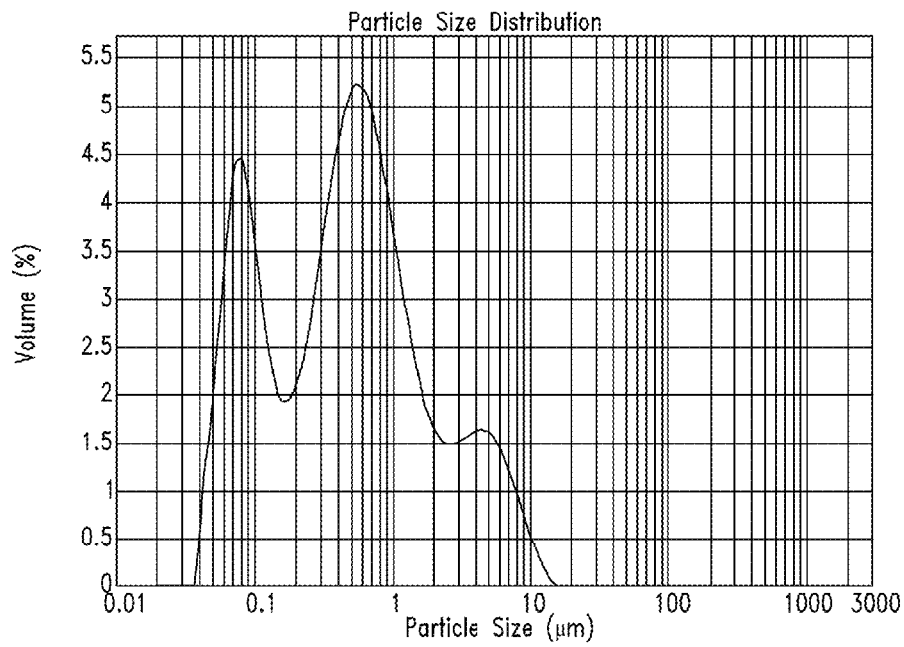
FIG. 9 presents the particle size distribution of a carbon sample collected from a jet milling operation.
Figure 10:
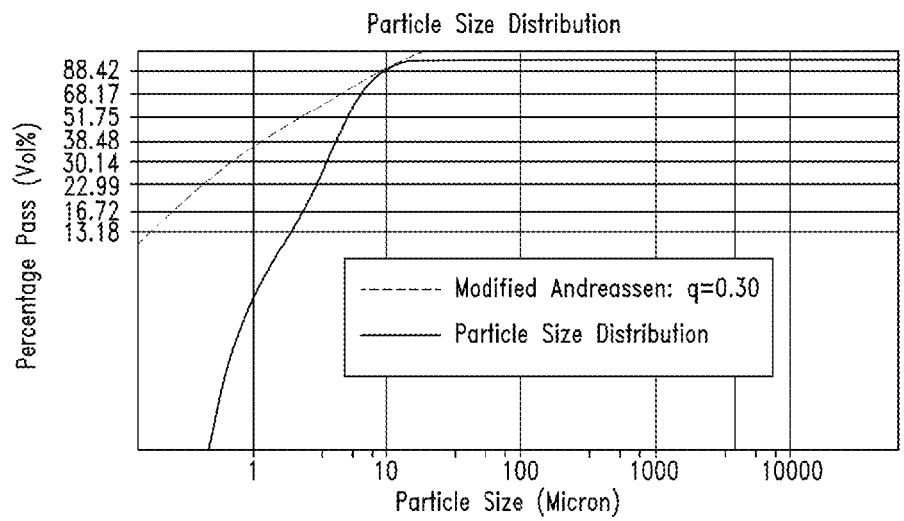
FIG. 10 is a graph showing the particle size distribution of a control carbon sample compared to the particle size distribution for the Andreassen equation.
Figure 11:
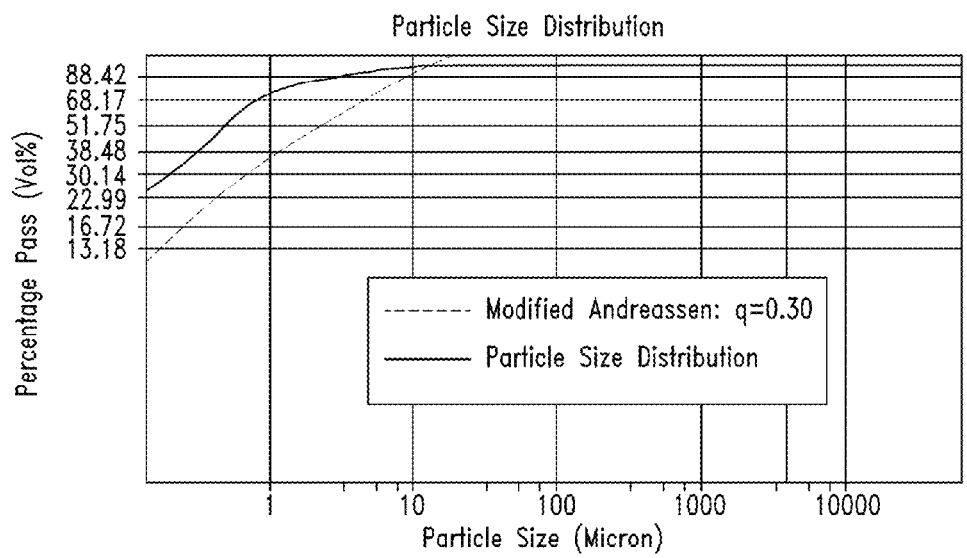
FIG. 11 shows the particle size distribution of a carbon sample collected from a jet milling operation compared to the particle size distribution for the Andreassen equation.

Activated carbon as described in Example 3 was jet milled in house. The main sample was collected and analyzed for the particle size distribution, yielding the result shown in FIG. 8. Additional material was harvested from the bag house collector, which provided a substantially lower particle size distribution (see FIG. 9). These two samples were analyzed for their fit to the Andreasson equation (see FIGS. 10 and 11, respectively). As described above, these two lots were blended theoretically to determine the ratio which would result in the best fit to the Andreasson equation.

Figure 12:
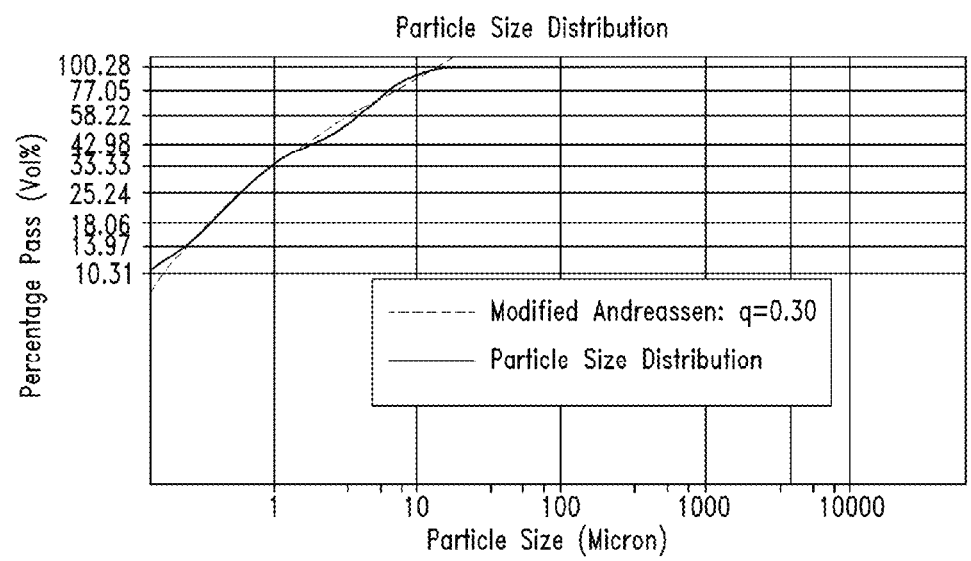
FIG. 12 demonstrates high correlation between the particle size distribution of an optimized carbon blend according to the present invention compared to the particle size distribution for the Andreassen equation.

It was determined that the optimal blend was comprised (by mass) of about 57% of the main sample (referred to herein as the "control material" or "control carbon") and 43% of the bag house collected material (the "additional material" noted above). As shown in FIG. 12, this particular composition fits the Andreassen equation with an $r^2$ value of about 0.98, compared to lower values obtained for the control material alone ($r^2$ value about 0.96) or the bag house material alone ($r^2$ value about 0.83). An actual carbon blend was then prepared using this exact composition.

Example 6

Correlation Coefficients of Commercial Carbon Samples

Several commercial carbons were obtained and their particle size distributions were measured. These data where compared using the correlation coefficient approach discussed in Example 4, i.e., compared to the modified Andreassen equation (q=0.3) for the particle size distribution. The results are tabulated in Table 2 below.

TABLE 2

Correlation Coefficients of Commercial Carbon Samples

| Commercial Carbon Sample | Correlation Coefficient |
| --- | --- |
| #1 | 0.92 |
| #2 | 0.95 |
| #3 | 0.95 |
| #4 | 0.87 |

Example 7

Dry Preparation of Electrodes and Capacitors Comprising the Disclosed Carbon Materials Capacitor electrodes comprised 99 parts by weight carbon particles (average particle size 5-15 microns) and 1 part by weight Teflon. Optimized carbon blends as described herein and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195° C. This removed water adsorbed from the atmosphere during electrode preparation. After drying, the electrodes were allowed to cool to room temperature, the atmosphere in the oven was filled with argon and the electrodes were moved into the dry box where the capacitors were made.

Capacitor coin cells for testing were prepared according to the following general procedure: A positive cap is placed inside a guide ring. One piece of conductivity enhancer is then placed in the center of the positive cap. A carbon electrode is placed on top of that. This electrode is referred to as cathode during charging up.

Using a glass dropper, 1M TEABF4/ACN electrolyte (or 1.8M TEMABF4/PC electrolyte) is added onto the electrode/conductivity enhancer stack. The open space of positive cap is filled with electrolyte. Next, 1 piece of NKK separator is placed into the positive cap on top of the electrode piece. The separator should be soaked well with little gas bubble in between. A second electrode (heavier than the first) is placed in the center of the separator in a similar fashion to the separator. This second electrode will be referred to as the anode during charging up. Several drops of electrolyte are added onto that to wet the above surface of the electrode.

A second piece of conductivity enhancer is then placed onto the electrode followed by a metal spacer on top of the stack. The spacer is slightly pressed down with the tip of tweezers to drive out air bubbles. Next, a spring is placed on top of the spacer, and a negative cap with gasket is placed on to cover the whole stack. The cell stack is then crimped to form the capacitor cell.

Example 8

Aqueous Slurry Preparation of Electrodes

Electrodes were prepared by mixing carbon samples (either the optimized blend prepared according to Example 5 ("Blend") or the control carbon ("CC")) with a binder ("B") (the binder in this example was LHB-108P available from LICO Technology Corp.) and an optional conductivity enhancer ("CE") (e.g., Super P, available from TIMCAL, Ltd., Vulcan XC-72, available from Akrochem Corp, Akron Ohio, etc.). Three different electrodes were prepared according to the following mixing ratios:
 Sample 1: 80% CC; 5% CE and 15% B;
 Sample 2: 85% Blend and 15% B; and
 Sample 3: 85% Blend and 15% B.

The above dry mixtures were added portionwise to water such that the final solid to solvent ratio was 1:2.5. Overhead mixing was used to ensure effective mixing. The slurry was first mixed at 575 rpm, then increased to 725 rpm after ¼th the volume of carbon added. This was repeated every fourth of the way increasing the setting to 1050 rpm and 1425 rpm, respectively. A homengenizer was used as needed (e.g., every twenty minutes) to ensure effective mixing. Manual stirring was also used as required to provide external assistance in the homogenizing process, and the slurry was degassed as required (e.g., for one hour). Coin cells were then prepared as described in Example 7.

A summary of the electrode densities achieved is provided in Table 3.

As can be seen, for the control sample (No. 1), it was only possible to achieve about 29% calendaring ratio (i.e., the ratio of the thickness of the electrode sheet after and before rolling), above this point, there was delamination observed of the electrode off from the current collector. For the blend, three electrodes were produced, and it is possible to achieve much higher calendaring ratios, up to as much as nearly 60%. For the control material, it was only possible to achieve a density of about 0.74 g/cc, corresponding to about 75% of the maximum obtainable density based on pore volume of the carbon material (or packing ratio of about 0.75). In dramatic contrast, for the optimized blended materials, it was possible to achieve densities as high as 0.837 g/cc, corresponding to up to 100% of the theoretical maximum density (or packing ratio of about 1.00). FIGS. 13a and 13b are TEM images showing the dramatic difference in densities between the control electrode (13a) and the electrode prepared with the optimized carbon blends disclosed herein (13b).

Finally, the electrochemical performance was measured for the control electrode (No. 1), and electrode No. 2 (the blended material wherein about 1.00 packing ratio was achieved). It was observed for the control that the gravimetric capacitance achieved was 102.9 F/g and the volumetric capacitance achieved was 18.5 F/cc. For the blended carbon material, there was a slight increase in the gravimetric capacitance observed, to 110.4 F/g (data for sample 2). In dramatic contrast, the volumetric capacitance for the blended material was 23.1 F/cc (data for sample 2), representing an increase of about 25%, concomitant with the 25% increase in density also achieved. Electrodes were tested in 1.8 M tetraethylene ammonium tetrafluoroborate in acetonitrile electrolyte.

Example 9

Organic Slurry Preparation of Electrodes

Electrodes were prepared by making a slurry of: 1). 80% CC; 5% CE and 15% B; or 2) 95% Blend and 5% B in an organic solvent (N-methylpyrrolidone (NMP)). The slurries were coated on an electrode substrate and dried in an oven.

Electrode thicknesses were measured and then each electrode was calendared from the original thickness to 50 µm using a manual rolling press. Electrodes comprising the blended carbon material had an original thickness of 94 um which was reduced by 47% to a final thickness of 50 µm. Electrodes comprising the control carbon had and original thickness of 111 mm which was reduced by 55% to a final thickness of 50 µm. Surprisingly, electrodes prepared via a dry mixing process (i.e., not a slurry process as described in this example) were not calanderable to 50 µm, although

TABLE 3

Characteristics of Electrodes Prepared from Various Blends

| No. | Pore Volume of Activated Carbon (cc/g) | Start Thick. (um) | End Thick. (um) | Cal. Ratio (%) | Electrode wt (mg) | Max Theor. Density (g/cc) | Actual Density (g/cc) | Pack. Eff. (%) |
|---|---|---|---|---|---|---|---|---|
| 1 | 0.847 | 93 | 66 | 29% | 19.68 | 0.99 | 0.742 | 75 |
| 2 | 0.942 | 95 | 44 | 54% | 14.81 | 0.83 | 0.837 | 100 |
| 3 | 0.942 | 98 | 40 | 59% | 12.84 | 0.83 | 0.799 | 96 | similar trends in electrode mass and volumetric performance were observed for a dry electrode preparation.

The data in Table 4 shows that the average mass of an electrode comprising the blend carbon was 29.4% greater than the average mass of an electrode comprising the control carbon.

TABLE 4

Electrode Masses

| Sample | Carbon | Mass (mg) | Avg. Mass (mg) |
|---|---|---|---|
| 1 | Blend | 12.94 | 12.98 |
| 2 | Blend | 12.86 | |
| 3 | Blend | 13.00 | |
| 4 | Blend | 12.83 | |
| 5 | Blend | 13.25 | |
| 6 | Control | 9.31 | 9.17 |
| 7 | Control | 8.85 | |
| 8 | Control | 9.05 | |
| 9 | Control | 9.44 | |
| 10 | Control | 9.19 | |

Figure 14:
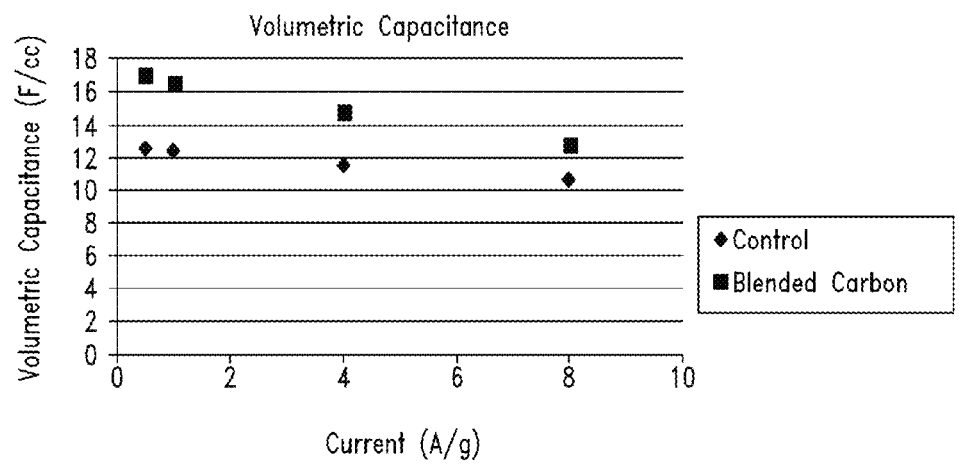
FIG. 14 presents volumetric capacitance data for electrodes prepared from a control carbon and an optimized carbon blend.
Figure 15:
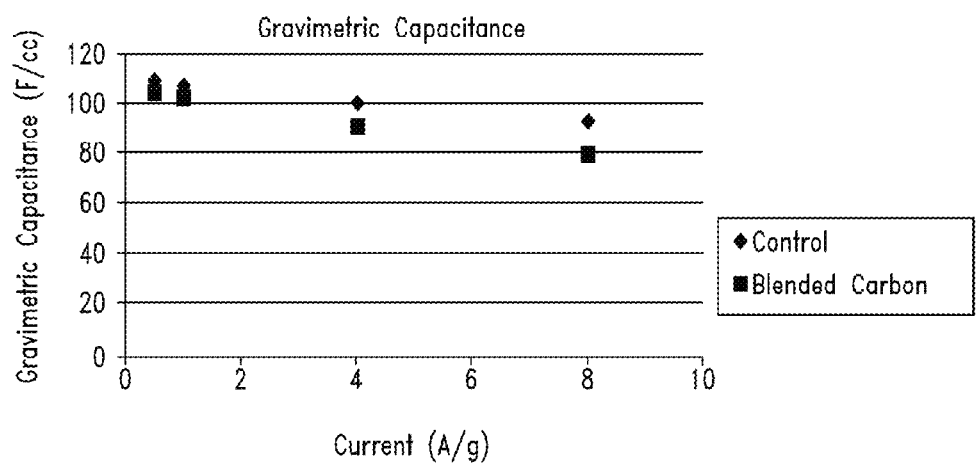
FIG. 15 is a graph showing gravimetric capacitance for electrodes prepared from a control carbon and an optimized carbon blend.

The electrodes in Table 4 were then tested for their electrochemical performance. Electrodes were tested in 1.8 M tetraethylene ammonium tetrafluoroborate in acetonitrile electrolyte. The data presented in FIG. 14 show that volumetric capacitance increased from 12.5 F/cc at 0.5 A/g in electrodes comprising the control carbon to 16.9 F/cc at 0.5 A/g in electrodes comprising the blended carbon (an increase of 26%). The gravimetric capacitance was similar between control carbon electrodes and blended carbon electrodes (FIG. 15).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising an energy storage material comprising a plurality of energy storage particles, wherein the plurality of energy storage particles comprises a particle size distribution such that the equation of a plot of the cumulative finer volume distribution vs. particle size comprises a correlation coefficient of 0.96 or greater relative to the modified Andreassen equation for the particle size distribution, and wherein the modified Andreassen equation comprises a q value of 0.3.

2. The device of claim 1, wherein the energy storage particles are a carbon material.

3. The device of claim 2, wherein the correlation coefficient is 0.97 or greater.

4. The device of claim 2, wherein the correlation coefficient is 0.99 or greater.

5. The device of claim 2, wherein the carbon material comprises a packing ratio of 0.97 or greater when formed into an electrode.

6. The device of claim 5, wherein the carbon material comprises a packing ratio of 1.0 or greater when formed into an electrode.

7. The device of claim 6, wherein the carbon material comprises a packing ratio of 1.1 or greater when formed into an electrode.

8. The device of claim 2, wherein the particle size distribution comprises particle sizes ranging from 0.01 µm to 20 µm.

9. The device of claim 8, wherein the particle size distribution comprises particle sizes ranging from 0.03 µm to 17 µm.

10. The device of claim 9, wherein the particle size distribution comprises particle sizes from 0.04 µm to 12 µm.

11. The device of claim 2, wherein the carbon material is prepared by blending two or more different carbon samples, each carbon sample comprising a different particle size distribution.

12. The device of claim 2, wherein the carbon material is activated, and the carbon material comprises a plurality of activated carbon particles.

13. The device of claim 2, wherein the carbon material comprises a plurality of activated carbon particles and a plurality of carbon black particles.

14. The device of claim 2, wherein the carbon material comprises a total impurity content of less than 500 ppm of elements having atomic numbers ranging from 11 to 92 as measured by proton induced x-ray emission.

15. The device of claim 2, wherein the carbon material comprises a BET specific surface area of 1500 $m^2/g$ or greater.

16. The device of claim 15, wherein the carbon material comprises a BET specific surface area of 2000 $m^2/g$ or greater.

17. The device of claim 16, wherein the carbon material comprises a BET specific surface area of 2400 $m^2/g$ or greater.

18. The device of claim 2, wherein the carbon material comprises a pore volume of at least 0.7 cc/g.

19. The device of claim 2, wherein the carbon material comprises a pore volume of at least 1.5 cc/g.

20. The device of claim 2, wherein the carbon material comprises a pore volume of at least 1.0 cc/g.

21. The device of claim 2, wherein the carbon material comprises a pore volume of at least 2.0 cc/g.

22. The device of claim 2, wherein the carbon material comprises a trimodal particle size distribution.

23. The device of claim 22, wherein the trimodal particle size distribution comprises particle size maxima at about 0.1 to about 0.2 µm, about 0.9 to about 1.0 µm and about 9 to about 10 µm.

24. The device of claim 2, wherein the carbon material comprises a calendaring ratio of at least 40%.

25. The device of claim 2, wherein the carbon material comprises a calendaring ratio of at least 50%.

26. The device of claim 2, wherein the carbon material comprises a calendaring ratio of at least 60%.

27. The device of claim 2, wherein the device is an electric double layer capacitor (EDLC) device comprising;
a) a positive electrode and a negative electrode, wherein each of the positive and negative electrodes comprise the carbon material;
b) an inert porous separator; and
c) an electrolyte;

wherein the positive electrode and the negative electrode are separated by the inert porous separator.

28. The device of claim 27, wherein the EDLC device comprises a volumetric capacitance of 10.0 F/cc or greater as measured by constant current discharge from 2.7 V to 0.1 V with a 5 second time constant employing a 1.8 M solution of tetraethylammonium-tetrafluoroborate in acetonitrile electrolyte and a current density of 0.5 A/g.

29. The device of claim 27, wherein the EDLC device comprises a volumetric capacitance of 20.0 F/cc or greater as measured by constant current discharge from 2.7 V to 0.1 V with a 5 second time constant employing a 1.8 M solution of tetraethylammonium-tetrafluoroborate in acetonitrile electrolyte and a current density of 0.5 A/g.

30. The device of claim 27, wherein the EDLC device comprises a volumetric capacitance of 23.0 F/cc or greater as measured by constant current discharge from 2.7 V to 0.1 V with a 5 second time constant employing a 1.8 M solution of tetraethylammonium-tetrafluoroborate in acetonitrile electrolyte and a current density of 0.5 A/g.

31. The device of claim 27, wherein the EDLC device comprises a gravimetric capacitance of 104 F/g or greater as measured by constant current discharge from 2.7 V to 0.1 V with a 5 second time constant employing a 1.8 M solution of tetraethylammonium-tetrafluoroborate in acetonitrile electrolyte and a current density of 0.5 A/g.

32. The device of claim 2, wherein the device is a battery.

33. The device of claim 32, wherein the battery is a lithium/carbon battery, lithium ion battery, lithium sulfur battery, zinc/carbon battery, lithium air battery or lead acid battery.

* * * * *